US010148330B2

(12) United States Patent
Jiang et al.

(10) Patent No.: US 10,148,330 B2
(45) Date of Patent: Dec. 4, 2018

(54) BEAMFORMING SMOOTHING AND INDICATION

(71) Applicant: Intel IP Corporation, Santa Clara, CA (US)

(72) Inventors: Feng Jiang, Santa Clara, CA (US); Qinghua Li, San Ramon, CA (US); Xiaogang Chen, Hillsboro, OR (US); Yuan Zhu, Beijing (CN); Wenting Chang, Beijing (CN); Xintian E. Lin, Palo Alto, CA (US)

(73) Assignee: Intel IP Corporation, Santa Clara, CA (US)

( * ) Notice: Subject to any disclaimer, the term of this patent is extended or adjusted under 35 U.S.C. 154(b) by 9 days.

(21) Appl. No.: 15/396,071

(22) Filed: Dec. 30, 2016

(65) Prior Publication Data

US 2017/0331534 A1 Nov. 16, 2017

Related U.S. Application Data

(60) Provisional application No. 62/334,288, filed on May 10, 2016, provisional application No. 62/364,551, filed on Jul. 20, 2016.

(51) Int. Cl.
*H04L 12/26* (2006.01)
*H04B 7/06* (2006.01)
*H04B 7/0452* (2017.01)

(52) U.S. Cl.
CPC ......... *H04B 7/0617* (2013.01); *H04B 7/0634* (2013.01); *H04B 7/0452* (2013.01); *H05K 999/99* (2013.01)

(58) Field of Classification Search
USPC ............... 370/229, 230, 236, 252, 328, 339
See application file for complete search history.

(56) References Cited

U.S. PATENT DOCUMENTS

| | | | | |
|---|---|---|---|---|
| 8,594,216 B2 * | 11/2013 | Van Zelst | ............ | H04B 7/0413 375/219 |
| 2012/0033592 A1 * | 2/2012 | Kim | ...................... | H04B 7/0452 370/310 |
| 2012/0058735 A1 * | 3/2012 | Vermani | .............. | H04B 7/0452 455/69 |
| 2013/0287069 A1 * | 10/2013 | Su | ........................ | H04B 7/0413 375/219 |

(Continued)

*Primary Examiner* — Kwang B Yao
*Assistant Examiner* — Nguyen Ngo
(74) *Attorney, Agent, or Firm* — Schwegman Lundberg & Woessner, P.A.

(57) ABSTRACT

Methods, apparatuses, computer readable media for beamforming smoothing and indication in a wireless network are disclosed. An apparatus of a wireless device comprising processing circuitry is disclosed. The processing circuitry is configured to decode a null data packet (NDP). The processing circuitry is further configured to determine beamforming vectors or matrixes from a channel matrix estimate from the NDP, and smooth the beamforming vectors or matrixes. The processing circuitry is further configured to configure the station to transmit feedback, the feedback including the smooth beamforming vectors or matrixes, and decode a downlink (DL) physical layer convergence procedure (PLCP) protocol data unit (PPDU)(DL PPDU) from the access point where the DL PPDU beamformed based on the smooth beamforming vectors or matrixes.

18 Claims, 20 Drawing Sheets

(56) References Cited

U.S. PATENT DOCUMENTS

| | | | |
|---|---|---|---|
| 2016/0134342 A1* | 5/2016 | Kneckt | H04B 7/0452 375/267 |
| 2016/0254884 A1* | 9/2016 | Hedayat | H04B 7/0413 370/329 |
| 2016/0301452 A1* | 10/2016 | Kwon | H04B 7/0421 |
| 2016/0328335 A1* | 11/2016 | Bhattacharyya | G06F 12/1408 |
| 2016/0330732 A1* | 11/2016 | Moon | H04B 7/0617 |
| 2016/0359532 A1* | 12/2016 | Cao | H04B 7/0421 |
| 2017/0170885 A1* | 6/2017 | Li | H04B 7/0617 |

* cited by examiner under 35 USC 119(e)
BEAMFORMING SMOOTHING AND INDICATION

PRIORITY CLAIM

This application claims the benefit of priority under 35 USC 119(e) to U.S. Provisional Patent Application Ser. No. 62/334,288, filed May 10, 2016, and U.S. Provisional Patent Application Ser. No. 62/364,551, filed Jul. 20, 2016, both of which are incorporated herein by reference in its entirety.

TECHNICAL FIELD

Embodiments relate to Institute of Electrical and Electronic Engineers (IEEE) 802.11. Some embodiments relate to wireless local area network (WLAN). Some embodiments relate to high-efficiency (HE) WLANs. Some embodiments relate to IEEE 802.11ax. Some embodiments relate computer readable media, methods, and apparatuses for beamforming smoothing and indication in a wireless network. Some embodiments relate to wireless local area network (WLAN).

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, the wireless devices may be moving and the signal quality may be changing. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
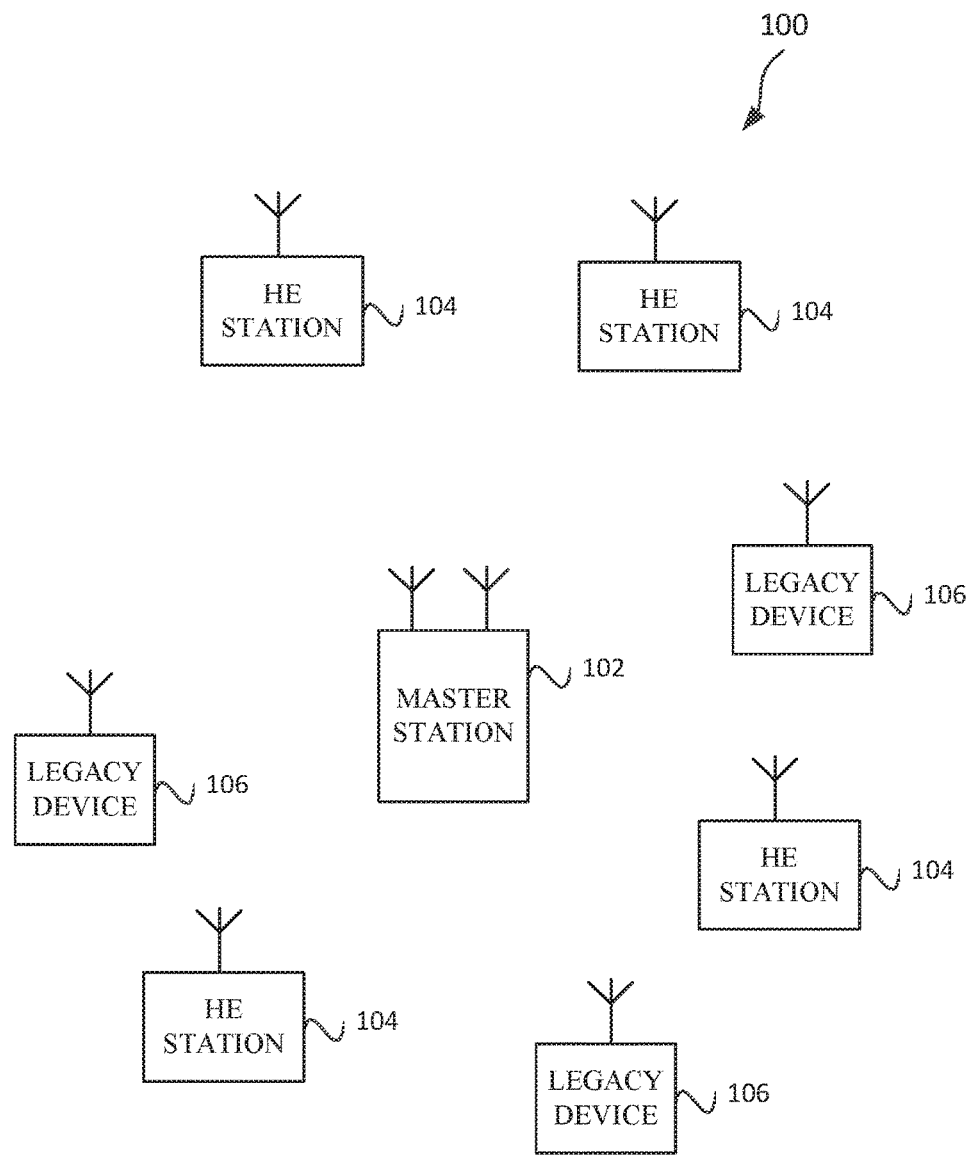
FIG. 1 illustrates a WLAN in accordance with some embodiments.

FIG. 1 illustrates a WLAN 100 in accordance with some embodiments. The WLAN 100 may comprise a BSS 100 that may include an HE access point 102, which may be an AP, a plurality of HE stations 104 (e.g., IEEE 802.11ax), and a plurality of legacy (e.g., IEEE 802.11n/ac) devices 106.

The HE access point 102 may be an AP using the IEEE 802.11 to transmit and receive. The HE access point 102 may be a base station. The HE access point 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), code division multiple access (CDMA), space-division multiple access (SDMA), and/or multiple-user multiple-input multiple-output (MU-MIMO). There may be more than one HE access point 102 that is part of an extended service set (ESS). A controller (not illustrated) may store information that is common to the more than one HE access points 102. In some embodiments, the BSS 100 may include a management entity (not illustrated), which may manage one or more BSSs. In some embodiments, the BSS 100 may include a router (not illustrated) that provides access to another network such as the Internet.

The legacy devices 106 may operate in accordance with one or more of IEEE 802.11 a/b/g/n/ac/ad/af/ah/aj/ay, or another legacy wireless communication standard. The legacy devices 106 may be stations or IEEE stations. The HE stations 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE stations 104 may be termed stations, HE stations, or stations (STAs).

The HE access point 102 may communicate with legacy devices 106 in accordance with legacy IEEE 802.11 communication techniques. In example embodiments, the HE access point 102 may also be configured to communicate with HE stations 104 in accordance with legacy IEEE 802.11 communication techniques.

In some embodiments, an HE frame may be configurable to have the same bandwidth as a channel. The HE frame may be a PPDU. In some embodiments, there may be different types of PPDUs that may have different fields and different physical layers and/or different media access control (MAC) layers. In some embodiments, there may be different PPDU formats for different communication standards, e.g., a non-high-throughput (non-HT) PPDU for IEEE 802.11a, HT PPDU for IEEE 802.11n, very HT (VHT) PPDU for IEEE 802.11ac, or HE PPDU for IEEE 802.1 lax.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz, 40 MHz, 80 MHz, 160 MHz, or 320 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a RU allocation in accordance with some embodiments.

In some embodiments, a 26-subcarrier RU and 52-subcarrier RU are used in the 20 MHz, 40 MHz, 80 MHz, 160 MHz and 80+80 MHz OFDMA HE PPM formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-AMMO HE PPM formats. In some embodiments, the 996-subcarrier RU is used in the 160 MHz and 80+80 MHz OFDMA and MU-MIMO HE PPDU formats.

An HE frame may be configured for transmitting a number of spatial streams, which may be in accordance with MU-MIMO and may be in accordance with OFDMA. In other embodiments, the HE access point 102, HE STA 104, and/or legacy device 106 may also implement different technologies such as CDMA 2000, CDMA 2000 1×, CDMA 2000 Evolution-Data Optimized (EV-DO), Interim Standard 2000 (IS-2000), Interim Standard 95 (IS-95), Interim. Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, an HE access point 102 may operate as an HE access point which may be arranged to contend for a wireless medium (e.g., during a contention period) to receive exclusive control of the medium for an HE control period. In some embodiments, the HE control period may be termed a transmission opportunity (TXOP). The HE access point 102 may transmit an HE trigger frame, at the beginning of the HE TXOP. The HE access point 102 may transmit a time duration of the TXOP, RU information, etc. During the HE TXOP, HE STAs 104 may communicate with the HE access point 102 in accordance with a non-contention based multiple access technique such as OFDMA or MU-MIMO. This is unlike conventional WLAN communications in which devices communicate in accordance with a contention-based communication technique, rather than a multiple access technique. During the HE TXOP, the HE access point 102 may communicate with HE stations 104 using one or more HE frames. During the HE TXOP, the HE stations 104 may operate on a channel narrower than the operating bandwidth of the HE access point 102. In some embodiments, the trigger frame may indicate one or more RUs which may be contention based for HE stations 104 and/or HE access point 102 during the TXOP. During the HE TXOP, legacy stations refrain from communicating. The legacy stations may need to receive the communication from the HE access point 102 to defer from communicating.

In accordance with some embodiments, during the HE TXOP the HE stations 104 may contend for the wireless medium with the legacy devices 106 being excluded from contending for the wireless medium during the HE TXOP. In some embodiments the trigger frame may indicate an UL MU-MIMO and/or UL OFDMA TXOP. In some embodiments, the trigger frame may include a DL MU-MIMO and/or DL OFDMA with a schedule indicated in a preamble portion of trigger frame for the HE stations 104 to decode the DL data and/or frame.

In some embodiments, the multiple-access technique used during the HE TXOP may be a scheduled OFDMA technique, although this is not a requirement. In some embodiments, the multiple access technique may be a TDMA technique, FDMA technique, SDMA, and/or CDMA.

The HE access point 102 may also communicate with legacy stations 106 and/or HE stations 104 in accordance with legacy IEEE 802.11 communication techniques. In some embodiments, the HE access point 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be an HE station 102 or an HE access point 102. In some embodiments, the HE station 104 and/or HE access point 102 may be configured to operate in accordance with IEEE 802.11mc. In some embodiments, one or more IEEE 802.11 communication standards may be termed WiFi. An HE station 104 and/or HE access point 102 may be termed an HE device (e.g., station or AP), if the HE device complies with wireless communication standard IEEE 802.11ax. In some embodiments, the HE stations 104 may have limited power. In some embodiments, the HE stations 104 may have limited power and may transmit on an RU less than 20 MHz in order to reach the HE access point 104.

In example embodiments, the HE station 104 and/or the HE access point 102 are configured to perform the methods and functions described herein in conjunction with FIGS. 1-22.

Figure 2:
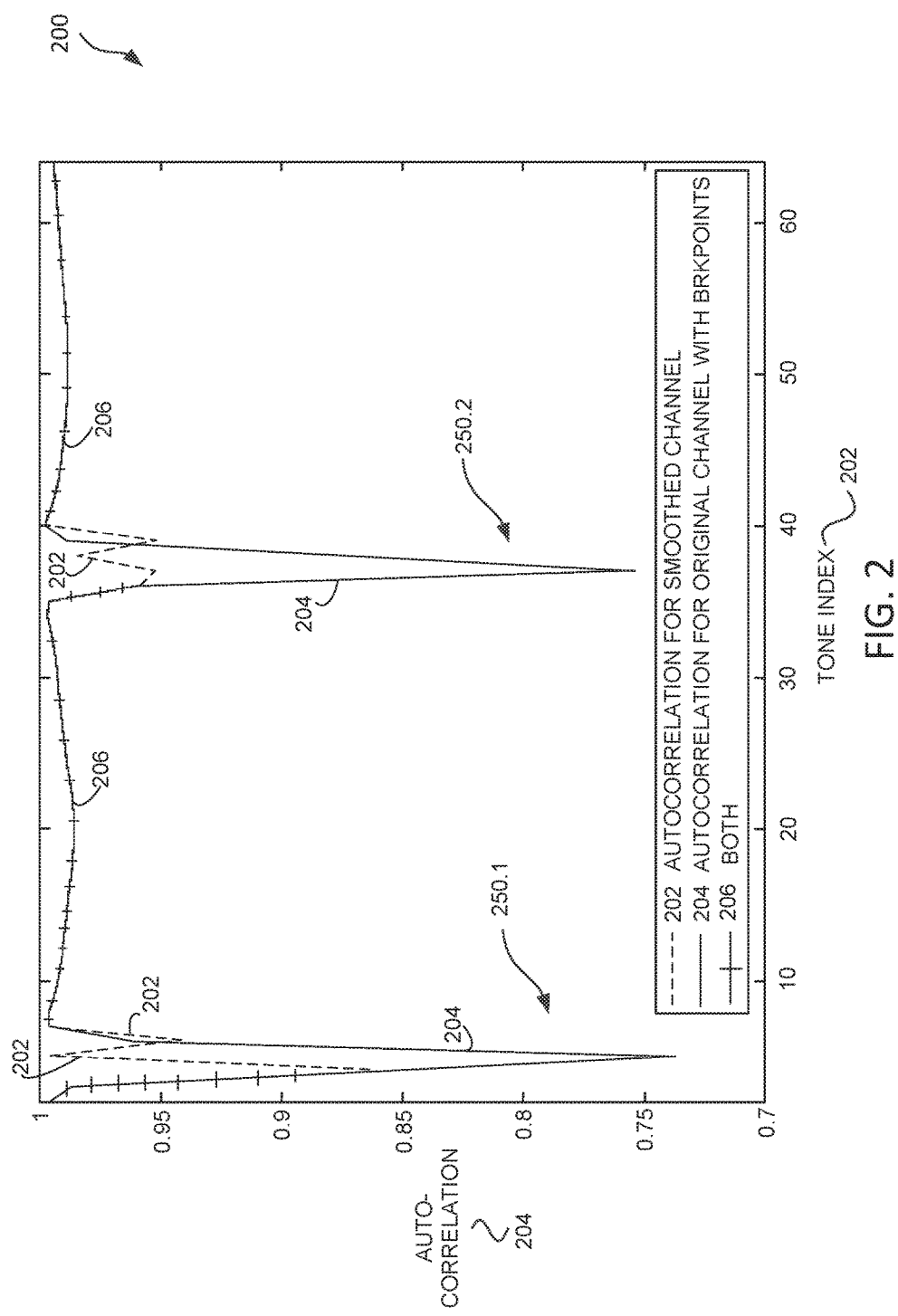
FIG. 2 illustrates the results of a simulation for a comparison of autocorrelation of beamforming vectors before and after smoothing in accordance with some embodiments.

FIG. 2 illustrates the results of a simulation for a comparison of autocorrelation of beamforming vectors before and after smoothing 200 in accordance with some embodiments.

Illustrated in FIG. 2 is tone index 202 along a horizontal axis and auto-correlation 204 along a vertical axis. The auto-correlation 204 indicates the correlation coefficient between adjacent beamforming vectors (e.g., beamforming vector $v_1$ 602, beamforming vector $v_2$ 604 of FIG. 6). The tone index 202 indicates the index of the tone of the received signal. Line 204 is autocorrelation for original channel with breakpoints (e.g., 250), and line 202 is autocorrelation for smoothed channel. Line 206 is when both lines overlap.

Breakpoints 250 are when a large variation or disruption occurs and the correlation drops from 0.98 auto-correlation 204 down to about 0.75 auto-correlation 204. This may occur because the direction of the beamforming vector suddenly rotates about 41 degrees from one tone (e.g., a tone indicated by tone index 202) to the next tone as compared to about a 12 degree rotation between tones in a normal (e.g., a typical) case. Breakpoint 250.1 occurs at tone index 202 of 3-6 and breakpoint 250.2 occurs at tone index 202 of 35-40.

The causes of the breakpoints 250 have been identified, in accordance with some embodiments. The breakpoints 250 may be more likely to occur in beamformed channels. The large variation (e.g., breakpoints 250) comes from a longer delay spread, which is introduced by singular value decomposition (SVD) calculation, which can make the large variations be twice the variation of a non-beamformed channel's variation. Additionally, in accordance with some embodiments, the channel estimation is sensitive to noise when two eigen-modes have similar beamforming gains so that a small noise can cause a large variation in the estimated beamforming vectors e.g., beamforming vector $v_1$ 602, beamforming vector $v_2$ 604 of FIG. 6). The disruption (e.g., breakpoints 250) of the beamformed channel comes from the rank reversal between two eigen-modes, in accordance with some embodiments. Without smoothing, the receiver (e.g., HE access point 102 and/or HE station 104) cannot track the breakpoints 250. The autocorrelation for smoothed channel 202 line is smooth using one of the methods described herein. The rotation of the beamforming direction is confined within 30 degrees instead of 41 degrees due to the smoothing, in accordance with some embodiments.

Figure 3:
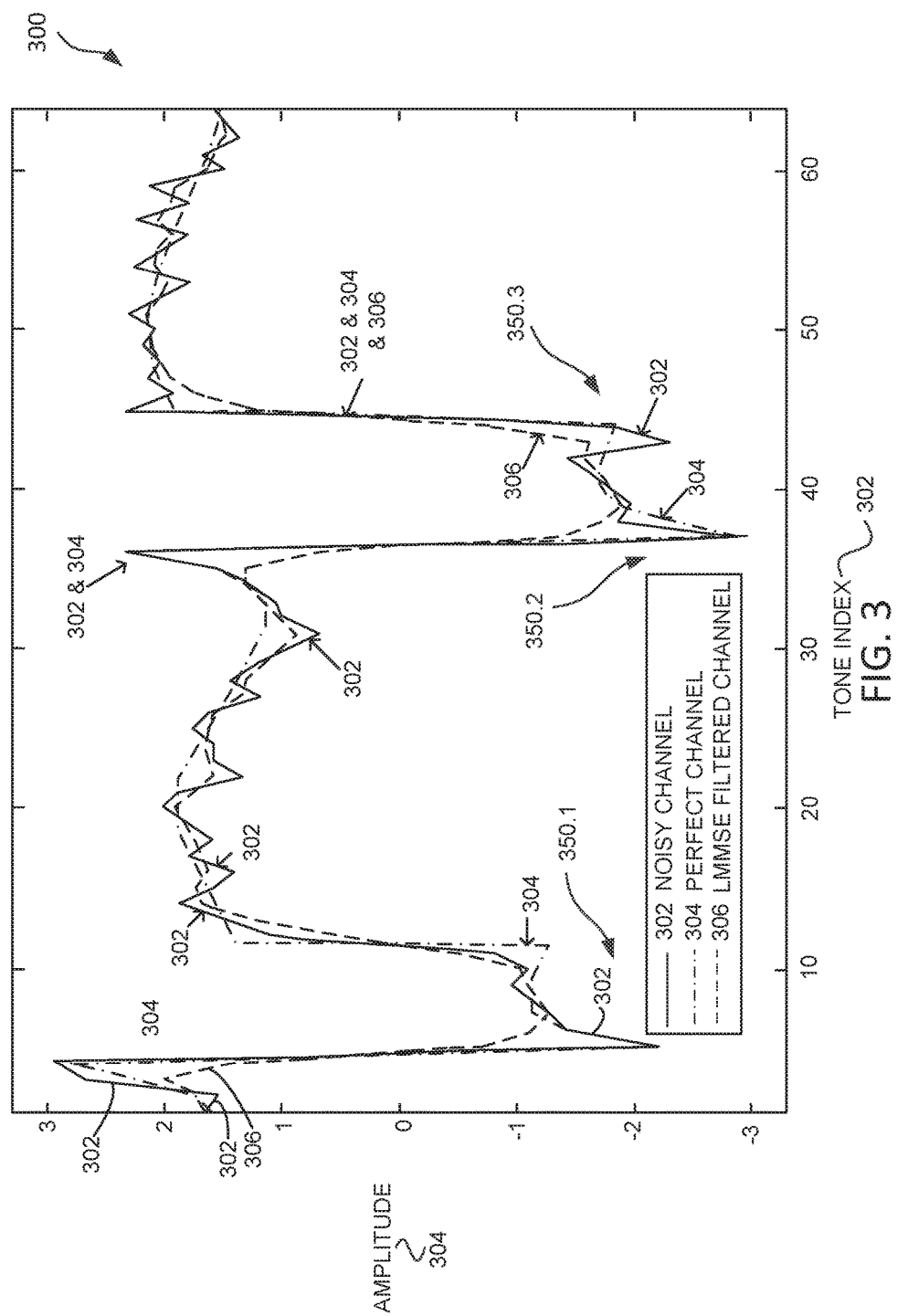
FIG. 3 illustrates the results of a simulation for frequency domain beamformed channel with breakpoints in beamforming vectors in accordance with some embodiments.

FIG. 3 illustrates the results of a simulation for frequency domain beamformed channel with breakpoints in beamforming vectors 300 in accordance with some embodiments. Illustrated in FIG. 3 is tone index 302 along a horizontal axis, amplitude 304 along a vertical axis, lines 302, 304, 306, and breakpoints 350. The amplitude 304 is the real part of the complex number of the corresponding channel response.

Perfect channel 304 line is the channel response. Noisy channel 302 line is the channel with noise. Linear minimum mean square error (LMMSE) filtered channel 306 line is the estimated channel by the receiver (HE station 104 and/or HE access point 102). The LMMSE filtered channel 306 line does not track well the perfect channel 304 line or the noisy channel 302 line at the breakpoints 350.

Figure 4:
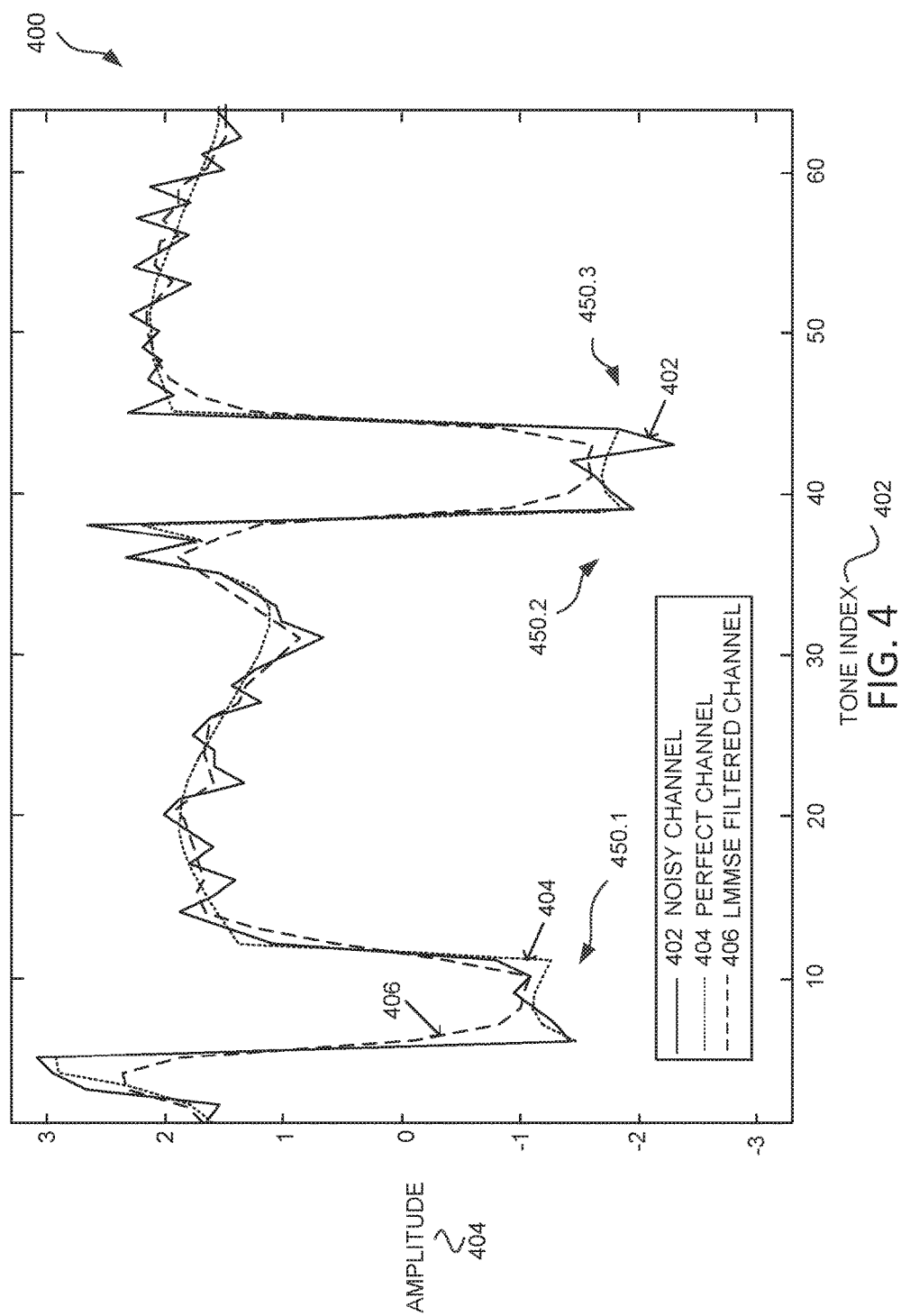
FIG. 4 illustrates the results of a simulation for frequency domain beamformed channel after smoothing breakpoints in beamforming vectors in accordance with some embodiments.

FIG. 4 illustrates the results of a simulation for frequency domain beamformed channel after smoothing breakpoints in beamforming vectors 400 in accordance with some embodiments. Illustrated in FIG. 4 is tone index 402 along a horizontal axis, amplitude 404 along a vertical axis, lines 402, 404, 406, and breakpoints 450. The amplitude 404 is the real part of the complex number of the corresponding channel response.

The channel changes at the breakpoints 450 are reduced compared with the breakpoints 350. LMMSE filtered channel 406 line is able to track the perfect channel 404 line and noise channel 402 line better than in FIG. 3.

Figure 5:
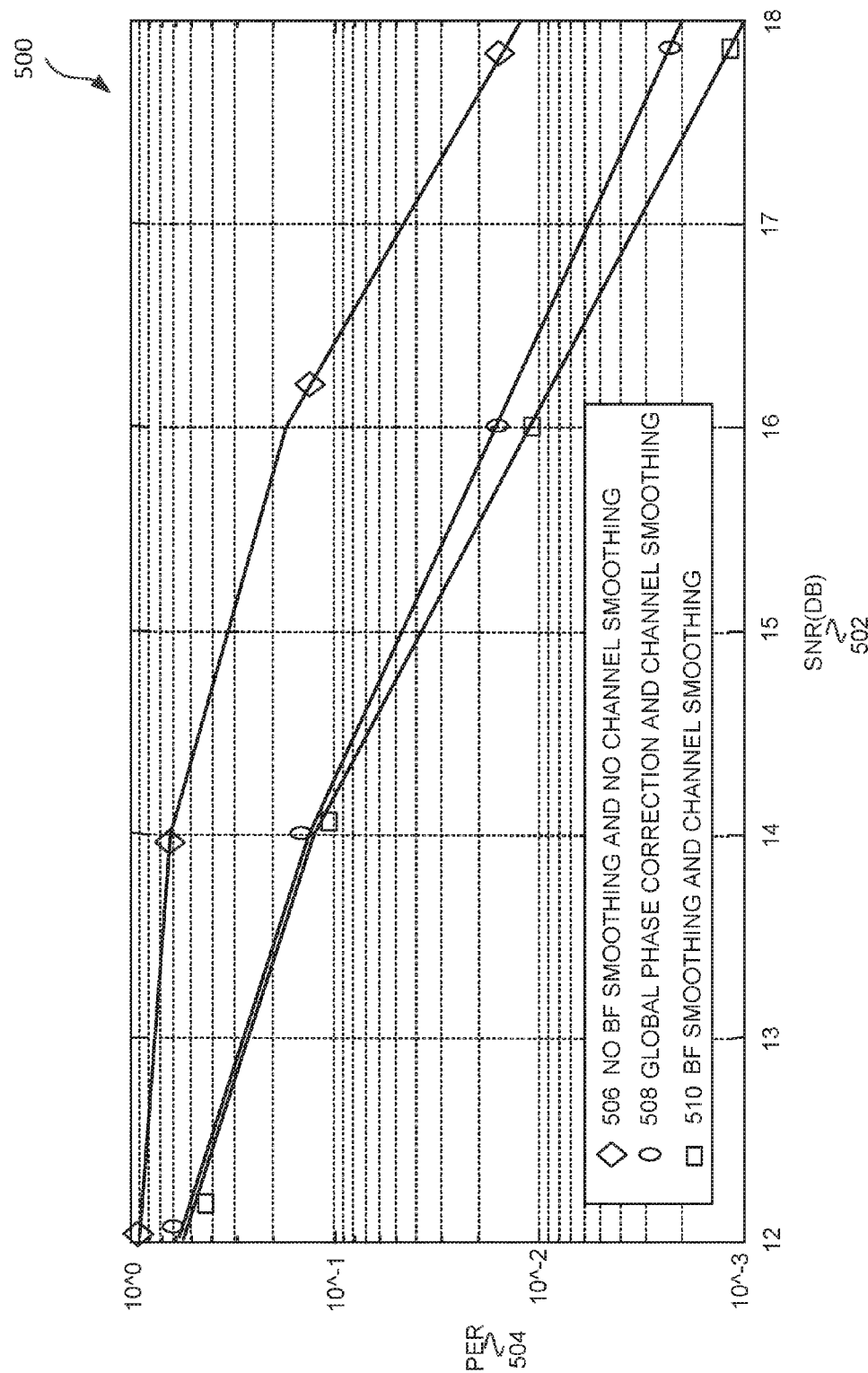
FIG. 5 illustrates the results of a simulation for packet error rates (PERs) for smoothing in accordance with some embodiments.

FIG. 5 illustrates the results of a simulation for packet error rates (PERs) 504 for smoothing in accordance with some embodiments. The transmission is with modulation and coding scheme (MCS) of 7, with long training fields whose duration is 4 times the duration of legacy (e.g., IEEE 802.11n/a.c) long training fields, 4 transmit antennas, 2 receive antennas, and 3 and 5 bits of the angle quantization of the beamforming vectors or matrixes (e.g., 1310 or 1312 of FIG. 13). PER 504 is along a vertical axis, and signal to noise ratio (SNR) in dB 502 along a horizontal axis.

The PER results indicate about 2.5 dB gain is achieved by global phase correction and channel smoothing 508 line and beamforming (BF) vector smoothing and channel smoothing 510 compared with no BF smoothing and no channel smoothing 506 line. Global phase correction and moving average are disclosed herein. The global phase correction and channel smoothing 508 line uses a simple phase rotation without changing the fundamental vector direction. BF vector smoothing and channel smoothing 510 line conducts a low pass filtering and power normalization on the corresponding elements of the beamforming vectors across neighboring tones (e.g., beamforming vector v1 602, beamforming vector v2 604 of FIG. 6). BF smoothing and channel smoothing 510 line may change the vector direction. Channel smoothing means the receiver (e.g., HE station 104 and/or HE access point 102) applies a smoothing technique such as LMMSE filtering to the channel estimates for reducing channel estimating errors. In some embodiments, channel smoothing is useful if the underlying channel is smooth (e.g., close to or the same as the perfect channel). In some embodiments, channel smoothing may have difficulties if the channel is not smooth, e.g., breakpoints 250, 350, or 1750.

Figure 6:
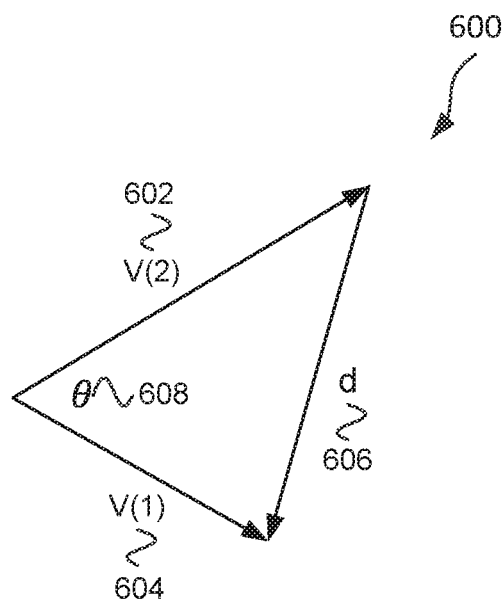
FIG. 6 difference (d) between beamforming, vector v1 and beamforming vector v2 in accordance with some embodiments.

FIG. 6 difference (d) 606 between beamforming vector v1 602 and beamforming vector v2 604 in accordance with some embodiments. Illustrated in FIG. 6 is d 606, beamforming vector v1 602, beamforming vector v2 604, and angle θ 608. In some embodiments, beamforming vector v1 602 and beamforming vector v2 604 are beamforming vectors of the same data stream for two adjacent tones. In some embodiments, for DL MU-MIMO, beamforming vector v1 602 and beamforming vector v2 604 are beamforming vectors of different data streams. D 606 is a difference or delta between beamforming vector v1 602 and beamforming vector v2 604.

In some embodiments, HE station 104 and/or HE access point 102 are configured to determine a conjugate transpose of a vector (e.g., a) using Equation (1):$a^H$. In some embodiments, HE station 104 and/or HE access point 102 are configured to determine the norm of a vector (e.g. a) using Equation (2): |α|=. The norm (not illustrated) is the length of the vector. In some embodiments, Equation (3): $|\alpha|^2 = \alpha^H \alpha$.

In some embodiments, when the HE station 104 and/or HE access point 102 calculates the square of the norm (e.g., Equation (3)), the calculation removes the square root operation in a norm Equation (2)) calculation. In some embodiments, HE stations 104 and/or HE access points 102 are configured to quantify the difference between two vectors (e.g., beamforming vector $v_1$ 602 and beamforming vector $V_2$ 604) or matrixes by subtracting one from the other or multiplying one with the other. The HE station 104 and/or HE access point 102 may derive smoothness metrics individually or jointly from the two quantities from the subtraction and the multiplication.

Figure 7:
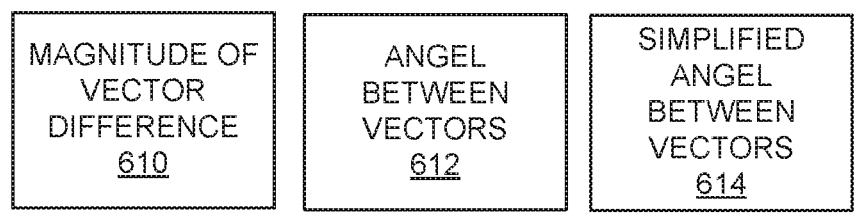
FIG. 7 illustrates methods for determining smoothness in accordance with some embodiments.

FIG. 7 illustrates methods for determining smoothness in accordance with some embodiments. Illustrated in FIG. 7 is magnitude of vector difference 610, angel between vectors 612, and simplified angle between two vectors 614. The simplified angel between two vectors 614 may be determined based on m=Re(p) where m is the simplified angle, and Re(p) is the real part of angle p. In some embodiments, HE stations 104 and/or HE access point 102 may determine smoothness metric M based on a magnitude of vector difference 610 using Equation (4) or Equation (5), where Equation (4) is $d = v_1 - v_2$, and Equation (5) is $d = v_2 - v_1$, and where d is d 606, v1 is beamforming vector v2 602, and v2 is beamforming vector v2 604.

If v1 and v2 have similar norm or the norms of v1 and v2 are normalized, then the HE station 104 and/or HE access point 102 may be configured to determine a smoothness (m) between beamforming vector v1 602 and beamforming vector v2 604 using Equation (6) m=|d| or Equation (7) $m = |d|^2 = d^H d$. The smaller the value of m, the more similar v1 and v1. If m=0, then beamforming vector v1 602 and beamforming vector v2 604 are the same.

In some embodiments, for DL MU-MIMO, the norms of the beamforming vectors beamforming vector v1 602 and beamforming vector v2 604 of different data streams may be different, and the norms of two adjacent vectors (e.g., beamforming vector v1 602 and beamforming vector v2 604) can be different. The HE station 104 and/or HE access points 102 may be configured to normize the norms of the vectors (e.g., beamforming vector v1 602 and beamforming vector v2 604) before computing the smoothness metric M. The HE station 104 and/or HE access points 102 may be configured to normalize the smoothness metric M with respect to the norms of the two vectors (e.g., beamforming vector v1 602 and beamforming vector v2 604) in computing the smoothness metric M. This may provide a more consistent smoothness metric M for vectors (e.g., beamforming vector v1 602 and beamforming vector v2 604) with different norms.

In some embodiments, when norms of two adjacent vectors (e.g., beamforming vector v1 602 and beamforming vector v1 604) are different, the HE station 104 and/or HE access points 102 are configured to normalize d 606 with respect to the norms of the two vectors (e.g., beamforming vector v1 602 and beamforming vector v2 604) for a consistent smoothness metric M for vectors (e.g., beamforming vector v1 602 and beamforming vector v2 604) with different norms. For example, the HE station 104 and/or HE access points 102 may determine smoothness metric M as follows Equation (8):

$$m = \frac{|d|^2}{|v_1||v_2|} \quad \text{Equation (8)}$$

or $$m = \frac{|d|^4}{|v_1|^2 |v_2|^2}. \quad \text{Equation (9)}$$

This is similar to the cross-correlation calculation of two random variables. If the norms of the two vectors (e.g., beamforming vector v1 602 and beamforming vector v2 604) are normalized e.g. to unity, the smoothness metric M calculation can be simplified e.g. to Equation (10): $m = |d|^2$.

In some embodiments, the HE station 104 and/or HE access points 102 may determine smoothness metric M based on an angle between vectors 612 (e.g., beamforming vector v1 602 and beamforming vector v2 604).

In some embodiments, the inner product of two vectors (e.g., v1 602 v2 604) can be determined as follows: Equation (11): $p = v_1^H v_2$ or Equation (11): $p = v_2^H v_1$. In some embodiments, the HE station 104 and/or HE access point 102 normalize beamforming vector $v_1$ 602 and beamforming vector v2 604 to the same number e.g. unity. If the norms of the two vectors (e.g., v1 602 v2 604) are normalized to unity, |p| is the cosine of the angle between the two vectors illustrated by θ 608. The HE station 104 and/or HE access point 102 may determine the smoothness metric M using Equation (12) $m = ||v_1||v_2|-p|$ or Equation (13) $m = ||v_1||v_2|-p|^2$. In some embodiments, p is a complex number with a phase, so the HE station 104 and/or HE access point 102 may be configured to convert p to a real number for the smoothness metric M. If m=0, the two vectors (e.g., v1 602 v2 604) are the same. If p=1, the two vectors (e.g., v1 602 v2 604) are in opposite directions and m reaches its peak. For a consistent smoothing metric M for vectors (e.g., v1 602 v2 604) with different norms, the HE station 104 and/or HE access point 102 may normalize the norms of the vectors (e.g., v1 602 v2 604) or normalize the smoothing metric m with respect to the norms of the two vectors (e.g., v1 602 v2 604) in computing the smoothing metric m before computing the smoothing metric in.

For example, the HE station 104 and/or HE access point 102 may determine m using one of the following equations.

$$m = \frac{p}{|v_1||v_2|}. \quad \text{Equation (14)}$$

$$m = \left|1 - \frac{p}{|v_1||v_2|}\right|. \quad \text{Equation (15)}$$

$$m = \left|1 - \frac{p}{|v_1||v_2|}\right|^2. \quad \text{Equation (16)}$$

Equations 14, 15, and 16 are similar to the cross-correlation calculation of two random variables. If the norms of the two vectors (e.g., v1 602, v2 604) are normalized, e.g., to unity, the smoothness metric m calculation can be simplified, e.g., to Equation (17) $m = |1-p|$, or Equation (18) $m = |1-p|^2$.

In some embodiments, the HE station 104 and/or HE access points 102 may determine smoothness metric M based on a simplified angle between two vectors 614 (e.g., beamforming vector $v_1$ 602 and beamforming vector $v_2$ 604).

Because beamforming vector $v_1$ 602 and beamforming vector $v_2$ 604 usually have the same or similar norms, the difference between beamforming vector $v_1$ 602 and beamforming vector $v_2$ 604 may be mainly on the directions of $v_1$ 602 $v_2$ 604. The smoothness metric m may be determined by the HE station 104 and/or RE access point 102 using the following. Smoothness metric m is equal to Equation (19) m=θ or Equation (20)m=Re(p), where Re(a) is real part of the complex number a and p is determined using Equation (11). If m=Re(p) greater than zero, then the θ 608 is less than 90 degrees. If the smoothness metric m is equal to Equation (21): m=Re(p) and the requirement is Equation (22): m>0, then this requirement can be met as follows. For example, if m<0, then we just need to flip the sign of $v_2$ 602 or $v_1$ 604, i.e. replacing $v_2$ 602 (or $v_1$ 604) by $-v_2$ 602 (or $-v_1$ 604) such that the new vector meets the requirement of Equation (22).

The complexity of the operation of complex number such as the calculation of the norm is higher than that of real numbers. Complex quantities such as complex beamforming vectors and the complex metrics as described herein may be split into a real part and an imaginary part. Two smoothness metrics instead of one may be used, one for the real part and the other for the imaginary. In some embodiments, only if one or both metrics of the real part and the imaginary part meet a predefined smoothness requirement, is the smoothness requirement of the beamforming vector met. For one example, one may first take the real part and/or the imaginary part of the beamforming vector and then check the smoothness of the real part and/or the imaginary part of the beamforming vector. For another example, the HE station 104 and/or HE access point 102 may first calculate the difference, d, across adjacent beamforming vectors (e.g., v1 and v2) using Equation (4) or (5), and then check whether the real part and/or the imaginary part of the difference, Re(d) and/or Im(d) (this method may be used instead of or in addition to Equations (6) and/or (7)), meet the smoothness requirement, where Im(a) is imaginary part of scalar or vector a. The smoothness metrics may then be used to determine which method to use for channel smoothing.

If the beamforming vector (e.g., v2 602 or $v_1$ 604) is a beamforming matrix with multiple beamforming vectors (e.g., $v_2$ 602 or $v_1$ 604), the HE station 104 and/or HE access point 102 may apply one or more of the smoothness metrics m disclosed herein to each vector of the matrix separately.

For example, the HE station 104 and/or HE access point 102 may be configured to determine a smoothness metric m using the i-th column of the beamforming matrix for the t-th tone compared with the i-th column of the beamformer for the (t+1)-th tone. Alternatively, the HE station 104 and/or HE access point 102 may determine a smoothness metric m for two beamforming matrixes using the following equation. Equation (22): m=|diag(I-$V_1^H V_2$)|, where $V_1$ and $V_2$ are the beamforming matrixes for two adjacent tones; I is the identity matrix; diag(A) takes the diagonal elements of matrix A to form a vector.

In some embodiments, the HE station 104 and/or HE access point 102 may compute a smoothness metric that is derived from the subtraction and/or multiplication of the adjacent beamforming vectors. The computed smoothness metric may be checked against a predefined requirement to determine whether the smoothness across the beamforming vectors meets the requirement. The requirement may be deterministic or probabilistic. For a deterministic example, a threshold e.g. 0.85 may be defined for m=Re(p) in Equation (20). If each of the metrics (ms), which are computed for the subcarriers of the resource allocation assigned to a HE station 104 and/or HE access point 102, is greater than the threshold, e.g., 0.85, then the smoothness requirement is met. In this example, the HE station 104 and/or HE access point 102 use the smoothness requirement to remove (e.g., detect whether there are breakpoints) any breakpoints across beamforming vectors. For a probabilistic example, a threshold, e.g. 0.85, may be defined for m=Re(p) in Equation (20). If each of the metrics ms, which are computed for the subcarriers of the resource allocation assigned to a HE station 104 and/or HE access point 102, is greater than the threshold, e.g., 0.85, with a probability greater than a predefined probability, e.g., 90%, then the smoothness requirement is met (e.g., the HE station 104 and/or HE access point 102 will determine the smoothness requirement is met and select an appropriate channel smoothing method for a smooth channel such as LMMSE). In this example, the smoothness requirement's goal is to limit the number of breakpoints across beamforming vectors within a certain bandwidth. In some embodiments, the smoothness requirement's goal is to limit the density of breakpoints across beamforming vectors. In some embodiments, this may enable some methods of channel smoothing to operate better.

In some embodiments, the HE station 104 and/or HE access point 102 do not determine the smoothness metric m for every single tone, e.g., the smoothness metric may be determined only for every k tones.

Figure 8:
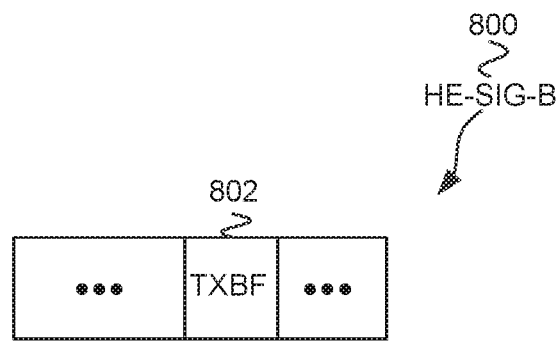
FIG. 8 illustrates an HE signal (SIG) B (BE-SIG-B) field in accordance with some embodiments.

FIG. 8 illustrates an HE signal (SIG) B (HE-SIG-B) 800 field in accordance with some embodiments. The HE-SIG-B 800 field includes a transmit (Tx) beamforming (TxBF) 802 field. The TxBF 802 field may be a bit that indicates whether data is beamformed or not. In some embodiments, the TxBF 802 field may be used by the transmitter (e.g, HE access point 102) to indicate whether the beamforming matrix or vector for a DL MU-MIMO transmission is smooth so that the receiver (e.g., HE station 104) can apply channel smoothing during channel estimation. The DL MU-MIMO transmission may always be beamformed so the TxBF 802 field may be re-used to indicate whether or not the beamforming matrix or vector for the DL MU-MIMO transmission is smooth.

In some embodiments, is a TxBF bit (e.g., 802) in a HE-SIG-A for single user (SU) mode, e.g., SU PPDU and extended range SU PPDU. The TxBF bit can be re-used to indicate whether or not the beamforming matrix or vector for the SU mode is smooth. In some embodiments, there is only HE-SIG-A and no HE-SIG-B in SU mode.

Figure 9:
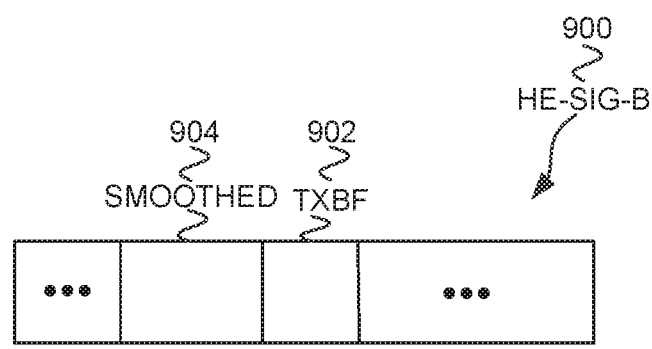
FIG. 9 illustrates an HE-SIG-B field in accordance with some embodiments.

FIG. 9 illustrates an HE-SIG-B 900 field in accordance with some embodiments. The HE-SIG-B 900 field includes a TxBF 902 field and a smoothed 904 field. The HE-SIG-B 900 field may be used for a MU transmission in an OFDMA mode or MU-MIMO mode. The TxBF 902 field may indicate whether the transmission is beamformed. The smoothed 904 field may indicate whether the beamforming vectors or matrixes for the MU OFDMA RU transmission are smoothed in accordance with embodiments disclosed herein. In some embodiments, the smoothed 904 field may be in a user specific field of the user in HE-SIG-B 900. Although both non-beamformed channel and smoothened beamformed channel are smooth, the smoothened beamformed channel (e.g., TXBF 902 field set and smoothed 904 field set) usually has a longer delay spread than the non-beamformed channel. Therefore, the receiver (e.g., HE station 104 and/or HE access point 102) may use different filters in the channel smoothing according to whether the smoothed 804 field is set or not.

Figure 10:
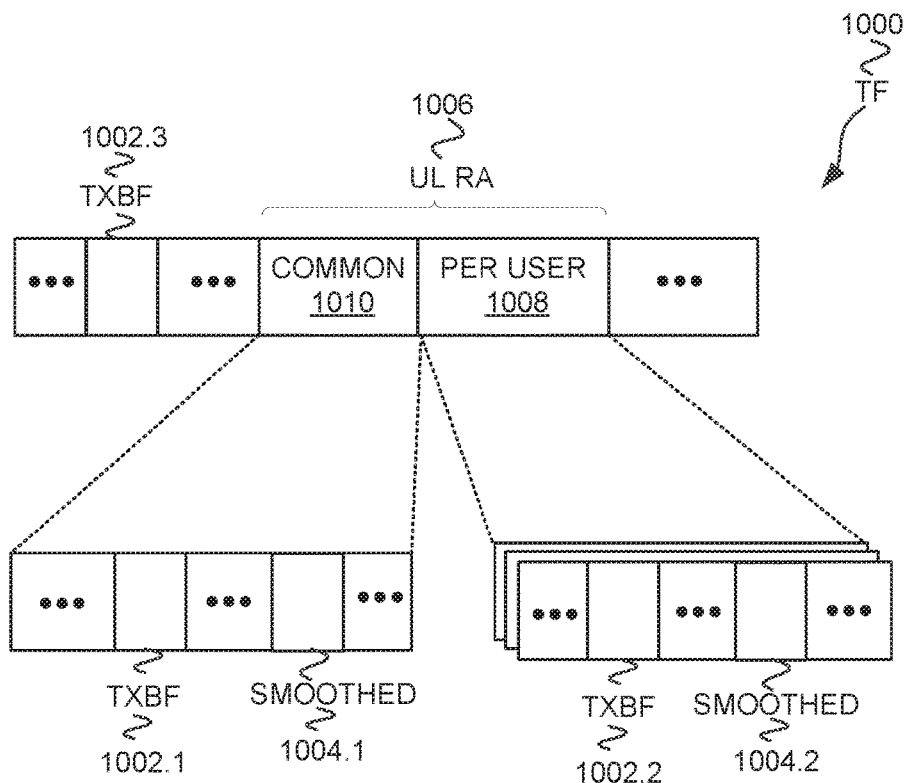
FIG. 10 illustrates a trigger frame (TF) in accordance with some embodiments.

FIG. 10 illustrates a trigger frame (TF) 1000 in accordance with some embodiments. The TF 1000 includes resource allocation (RA) 1006 (e.g., for one or more HE stations 104) which may be an UL resource allocation for a UL MU-MIMO and/or OFDMA transmission. In some embodiments, the TF 1000 does not include the TxBF 1002.3 field, the TxBF 1002.1, or the TxBF 1002.2 (e.g., there is no TxBF 1002 field in the TF 1000). An HE access point 102 may generate the TF 1000 for one or more HE stations 104 for the UL MU-MIMO and/or OFDMA transmission. The TxBF 1002 field may indicate whether the data to follow is transmitted with beamforming.

The UL RA 1006 may include a common 1010 portion and a per user 1008 portion. The common 1010 portion may include parameters that are shared among the HE stations 104 addressed in the IF 1000. The per user 1008 portion may include parameters for each HE station 104 addressed in the TF 1000, e.g., each per user 1008 field may include an association identifier (AID) that identifies the HE station 104 for which the parameters are for, an RU, modulation, coding, transmission power, spatial stream allocation, TxBF 1002.2 field, and smoothed 1004.2. In some embodiments, the TxBF 1002.2 field is not included in the per user 1008 portion. In some embodiments, the smoothed 1004.2 field is not included in the per user 1008 portion.

In some embodiments, the TxBF 1002 field is part of one of the following: the TF 1000 (e.g., TxBF 1002.2), a common 1010 portion (e.g., TxBF 1002.1), or a per user 1008 portion (e.g., TxBF 1002.2). In some embodiments, the TxBF 1002 field is part of two of the following: the TF 1000 (e.g., TxBF 1002.2), a common 1010 portion (e.g., TxBF 1002.1), or a per user 1008 portion (e.g., TxBF 1002.2).

In some embodiments, the common 1010 portion includes TxBF 1002.1 and smoothed 1004.1. In some embodiments, the common 1010 portion does not include the TxBF 1002.1 field. In some embodiments, the common 1010 portion does not include the smoothed 1004.1 field.

In some embodiments, the TxBF 1002.1 is part of a common 1010 portion of the UL RA 1006 so that the TxBF 1002.2 field applies to each of the HE stations 104 addressed in the TF 1000. In some embodiments, the smoothed 1004.2 field is part of the per user 1008 portion of UL RA 1006 so that each HE station 104 may have their own smoothed 1004.2 field. In some embodiments, the smoothed 1004.1 field is part of a common 1010 portion of the UL RA 1006 so that the smoothed 1004.1 field applies to each of the HE stations 104 addressed in the TF 1000. In some embodiments, TF 1000 does not include smoothed 1004.1 or smoothed 1004.2.

The HE access point 102 specifies the HE access point's 102 preferences in the TF 1000. If the HE station 104 doesn't have the beamforming matrix or vector from the beamforming feedback from the HE access point 102), the HE station 104 may use a default beamforming matrix or vector such as the one for open-loop transmission, which is smooth.

If the HE station 104 has the beamforming matrix or vector (e.g. from the beamforming feedback from the HE access point 102), then the HE station 104 may use them and apply smoothing in accordance with an embodiment disclosed herein. Since the HE access point 102 knows whether it feedbacks the beamforming vectors or matrixes to the HE station 104, the HE access point 102 can set indications of beamforming and smooth beamforming in the TF 1000 accordingly. If the HE access point 102 sent feedback that included smooth beamforming vectors or matrixes and requests smooth transmission, the HE station 104 should use smooth beamforming or smooth non-beamforming transmission. The HE station 104 may reduce the quantization error in the feedback by filtering to meet the smoothness requirement. If the HE access point 102 sent feedback that included smooth beamforming vectors or matrixes and requests beamforming transmission (TxBF 1002 field set), the HE station 104 should use smooth beamforming transmission.

In some embodiments, the UL RA 1006 (e.g., does not include either smoothed 1004.1 field or smoothed 1004.2 field) does not include smoothed 1004, and if TxBF 1002 field is set, then the HE station 104 smooths the beamforming vectors or matrixes if the HE access point 102 sent feedback with smoothed beamforming vectors or matrixes.

Figure 11:
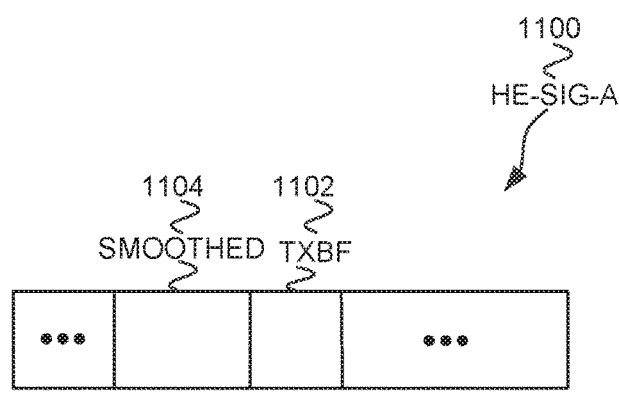
FIG. 11 illustrates an HE-SIG-A in accordance with some embodiments.

FIG. 11 illustrates an RE-SIG-A 1100 in accordance with some embodiments. The HE-SIG-A 1100 may be part of a SU transmission (e.g., an HE SU PPDU). The HE-SIG-A 1100 may include smoothed 1004 field and TxBF 1102. In some embodiments, HE-SIG-A 1100 field does not include smoothed 1104. In some embodiments, the HE-SIG-A 1100 field does not include the TxBF 1102 field. In some embodiments, the smoothed 1104 field indicates whether the SU transmission is smoothed. In some embodiments, the TxBF 1102 field indicates whether the SU transmission is beamformed. In some embodiments, the HE-SIG-A 1100 includes only the TxBF 1102 field, and if the TxBF 1102 field is set then it indicates that the beamforming is used and that smoothing is used (e.g., smoothing is used if feedback has been received from the receiver of the SU transmission).

In some embodiments, if the receiver feedbacks smooth beamforming matrixes or vectors, the receiver should expect smooth beamformed used by the transmitter of the SU transmission if the transmission is beamformed (e.g., TxBF 1102 is set). The transmitter of the SU transmission should use the beamforming feedback (if there was feedback) and smooth the reconstructed beamforming matrixes or vectors for reducing the quantization error. In some embodiments, the HE station 104 and/or HE access point 102 may be configured to insure that the smoothness of the beamformer vectors and matrixes used for the SU transmission are not less smooth than the smoothness of the beamforming feedback from the intended receiver of the SU transmission. In some embodiments, one of two methods may be used for beamforming smoothness and indication.

Figure 12:
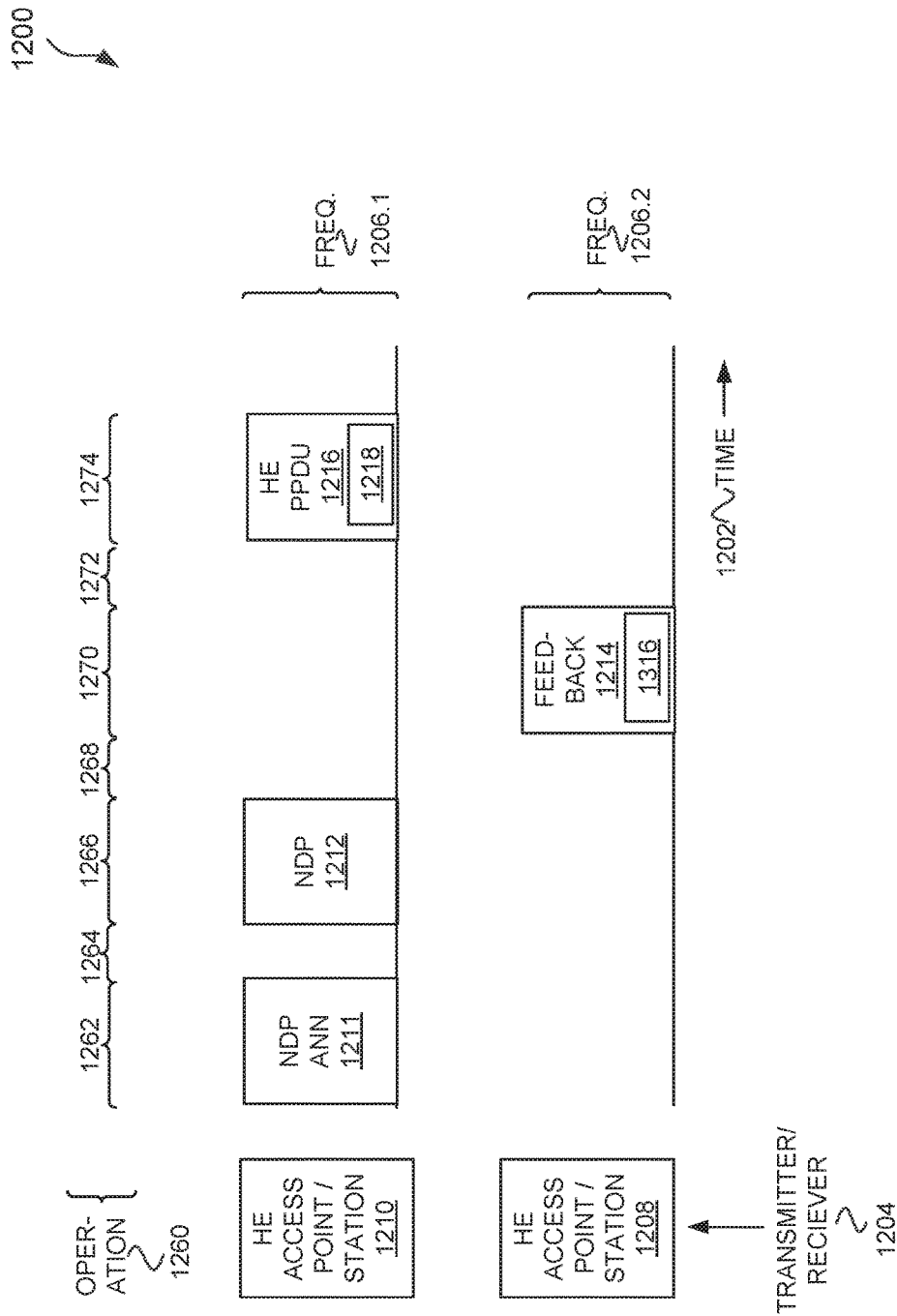
FIG. 12 illustrates a method for beamforming smoothness and indication in accordance with some embodiments.

FIG. 12 illustrates a method 1200 for beamforming smoothness and indication in accordance with some embodiments. Illustrated in FIG. 12 is time 1202 along a horizontal axis, transmitter/receiver 1204, frequency 1206, and operations 1260 along the top. The frequency 1206 may be a channel, e.g., an RU, bandwidth, etc. The frequency 1206.1 and frequency 1206.2 may be a same channel or different channels.

Optionally, the method 1200 may begin with the HE access point/station 1208 contending for and gaining access to the wireless medium (not illustrated). Optionally, the method 1200 continues at operation 1262 with HE access point/station 1210 transmitting a null data packet (NDP) announcement (ann) 1211. The NDP announcement 1211 may include a schedule or indication of UL resources or feedback requirements such as frequency down-sampling factor and quantization resolution for the HE access point/station 1208 to use to transmit the feedback 1214. In some embodiments, there may be more than one HE access point/station 1208 providing feedback 1214. In some embodiments, the NDP 1212 may be transmitted on more than one frequency 1206, e.g., the NDP 1212 may be transmitted on each of 2, 4, 8, or 16 20 MHz channels.

The method 1200 continues at operation 1264 with the HE access point/station 1208 waiting a duration before transmitting, e.g, a short interframe space (SIFS).

The method 1200 continues at operation 1266 with HE access point/station 1210 transmitting a NDP 1212. HE access point/station 1208 receives the NM) 1212 (e.g., NDP 1301) and obtains (e.g., 1320) channel matrix estimates across tones (e.g., channel matrix estimates across tones 1302) based on the NDP 1212. HE access point/station 1208 may smooth (e.g., 1322) the channel matrix estimate across tones to reduce the noise effect (e.g., channel matrix estimates with reduced noise across tones 1304). The HE access point/station 1208 calculates (e.g., 1324) beamforming vectors or matrixes (e.g., beamforming vectors or matrixes 1306) using the channel matrixes (e.g., channel matrix estimates with reduced noise across tones 1304). The calculation may use SVD.

HE access point/station 1208 checks whether the calculated beamforming vectors or matrixes are smooth across tones, e.g., using magnitude of vector difference 610, angel between vectors 612, or simplified angel between two vectors 614. If not, the HE access point/station 1208 smooths (e.g., smooth 1326) the beamforming vectors or matrixes (e.g., beamforming vectors or matrixes 1306). The smoothing may use a method disclosed herein.

HE access point/station 1208 quantizes (e.g., 2-16 bits) the smoothed beamforming vectors or matrixes (e.g., smooth beamforming vectors or matrixes 1310) to generate feedback 1214 with quantized beamforming vectors or matrixes, e.g., quantized beamforming vectors or matrixes 1316. The feedback 1214 may also include other information beside beamforming vectors or matrixes e.g, the beamformed channel gains (e.g., the singular values of the SVD). The feedback 1214 may include quantized beamforming vectors or matrixes (e.g., quantized beamforming vectors or matrixes.)

The method 1200 continues at operation 1268 with the HE access point/station 1208 waiting a duration before transmitting, e.g., a SITS duration. The method 1200 continues at operation 1270 with HE access point/station 1208 transmitting the feedback 1214. The HE access point/station 1210 receives the feedback 1214.

In some embodiments, the HE access point/station 1210 checks the smoothness of the generated beamformer vectors or matrixes, e.g, using one or more of the methods described herein. In some embodiments, if the smoothness requirement is not met, the HE access point/station 1210 transmitter smooths the beamformer vectors or matrixes such that the smoothed beamformer vectors or matrixes meet the smoothness requirement. The smoothness requirement may be a predetermined constant, a value, specified in a communication standard, a communicated constant from an HE access point 102, etc. The HE access point/station 1210 may smooth 1332 quantized beamforming vectors or matrixes 1316 received from HE access point/station 1208 to lessen quantization errors from the quantize 1330 process.

The method 1200 continues at operation 1272 with the HE access point/station 1210 waiting a duration, e.g., SIFS. The method 1200 continues at operation 1274 with HE access point/station 1210 transmitting an HE PPDU 1216 using the beamformer vectors or matrixes quantized beamforming vectors or matrixes 1316 or smoothed quantized beamforming vectors or matrixes 1318). HE PPDU 1216 may include a TxBF 1218 field, e.g., 802, 902, or 1002, and may include a smoothed field, e.g., 804, 904, and 1004.

In some embodiments, the HE access point/station 1208 may conduct channel smoothing for the received HE PPDU 1216 differently depending on whether the beamforming vectors or matrixes 1306 have been smoothed before quantization 1330, 1328 to generate quantized beamforming vectors or matrixes 1316. The HE access point/station 1208 may determine whether the beamforming vectors or matrixes 1306 have been smoothed based on one or both of the feedback 1214 (e.g., the processing the HE access point/station 1208 performed) and the TxBF 1218 field, which may indicate the processing that has been performed on the beamforming vectors or matrixes (e.g., quantized beamforming vectors or matrixes 1316 or smoothed quantized beamforming vectors or matrixes 1316) used to beamform HE PPDU 1216.

In some embodiments, HE access point/station 1208 smooths the received HE PPDU 1216 depending on how the HE access point/station 1208 processed the feedback 1214. For example, the HE access point/station 1208 may assume that the HE access point/station 1210 will use the quantized beamforming vectors or matrixes 1316 transmitted in the feedback 1214 or smoothed quantized beamforming vectors or matrixes 1318. If the HE access point/station 1208 generates the quantized beamforming vectors or matrixes 1316 from the beamforming vectors or matrixes 1306 instead of the smooth beamforming vectors or matrixes 1310, then the HE access point/station 1208 may select a different smoothing method than if quantized beamforming vectors or matrixes 1316 is generated from smooth beamforming vectors or matrixes 1310.

Figure 13:
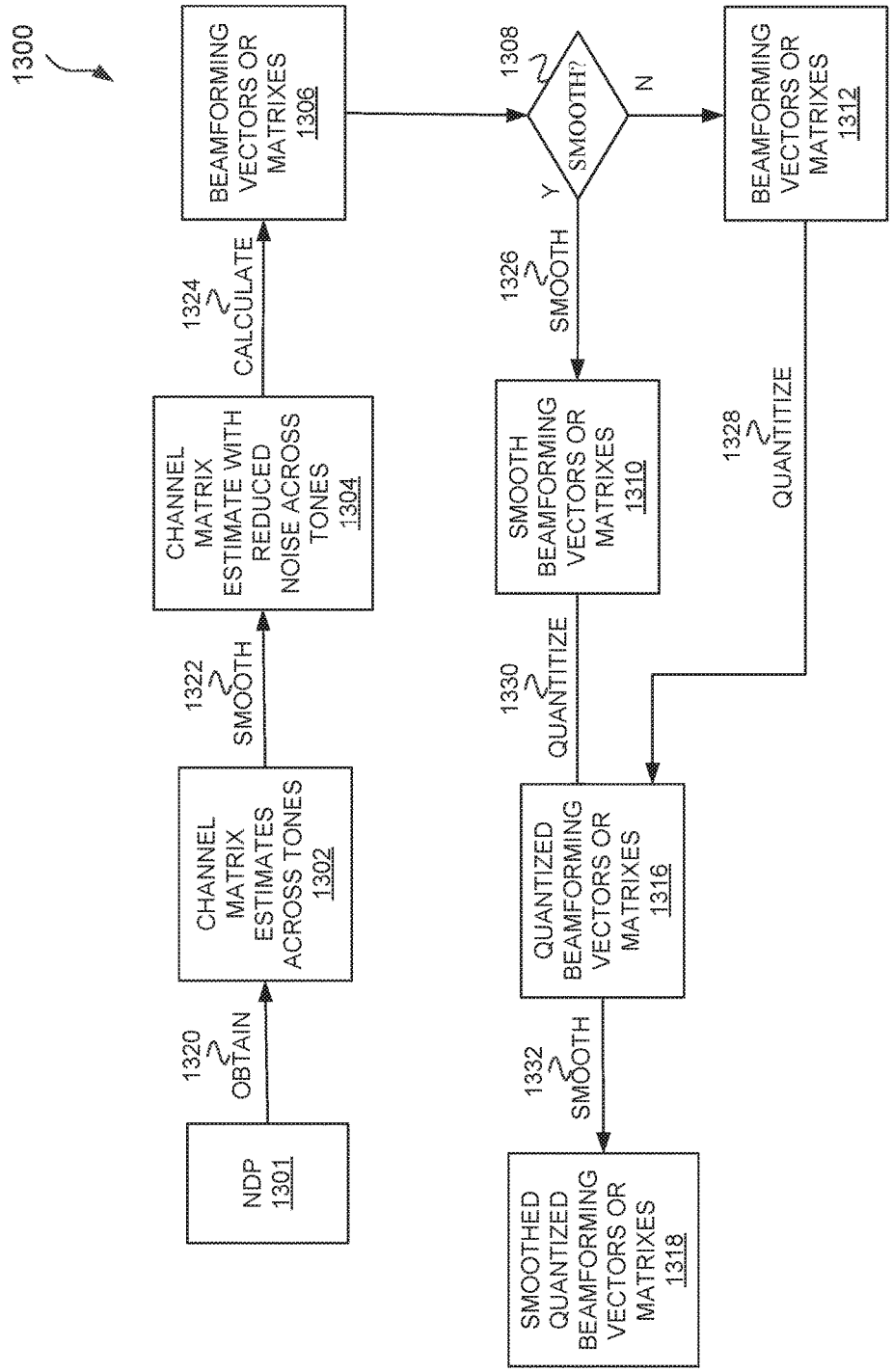
FIG. 13 illustrates a dataflow diagram for beamforming smoothing and indication in accordance with some embodiments.

FIG. 13 illustrates a dataflow diagram for beamforming smoothing and indication 1300 in accordance with some embodiments. The NDP 1301 may be a NDP transmitted by an HE station 104, legacy device 106, and/or HE access point 102. An HE access point 102 and/or HE station 104 may obtain 1320 channel matrix estimate across tones 1302 based on receiving the NDP 1301.

An HE access point 102 and/or HE station 104 may conduct channel smoothing, smooth 1322, on the channel matrix estimates across tones 1302 to generate channel matrix estimates with reduced noise across tones 1304. For example, HE access point 102 and/or HE station 104 may use one of the methods described herein.

An HE access point 102 and/or HE station 104 may calculate 1324 from the channel matrix estimates with reduced noise across tones 1304 to generate the beamforming vectors or matrixes 1306.

An HE access point 102 and/or HE station 104 may determine at 1308 whether to smooth the beamforming vectors or matrixes 1306. This may be based on whether beamforming vectors or matrixes 1306 needs smoothing or on whether or not the HE access point 102 and/or HE station 104 is to do the smoothing or another HE access point 102 and/or HE station 104 is to do the smoothing. HE access point 102 and/or HE station 104 may determine the smoothness using one or more of magnitude of vector difference 610, angel between vectors 612, and/or simplified angel between two vectors 614.

The HE access point 102 and/or HE station 104 may smooth 1326 the beamforming vectors or matrixes 1306 to generate smooth beamforming vectors or matrixes 1310. The HE access point 102 and/or HE station 104 may use one or more of the methods to smooth as disclosed herein.

The HE access point 102 and/or HE station 104 may quantize 1328, 1330 either the beamforming vectors or matrixes 1312 or the smooth beamforming vectors or matrixes 1310 to generate the quantized beamforming vectors or matrixes 1316. The quantization may be based on a number of bits for the quantization resolution, (5, 7) bits or (7, 9) bits for two different types of angles under quantization.

The HE access point 102 and/or HE station 104 may smooth 1332 the quantized beamforming vectors or matrixes 1316 to generate smoothed quantized beamforming vectors or matrixes 1318. In some embodiments, one or more of the beamforming vectors or matrixes 1312, smooth beamforming vectors or matrixes 1310, quantized beamforming vectors or matrixes 1316, and/or smooth quantized beamforming vectors matrixes 1318 may be compressed using methods disclosed herein.

Figure 14:
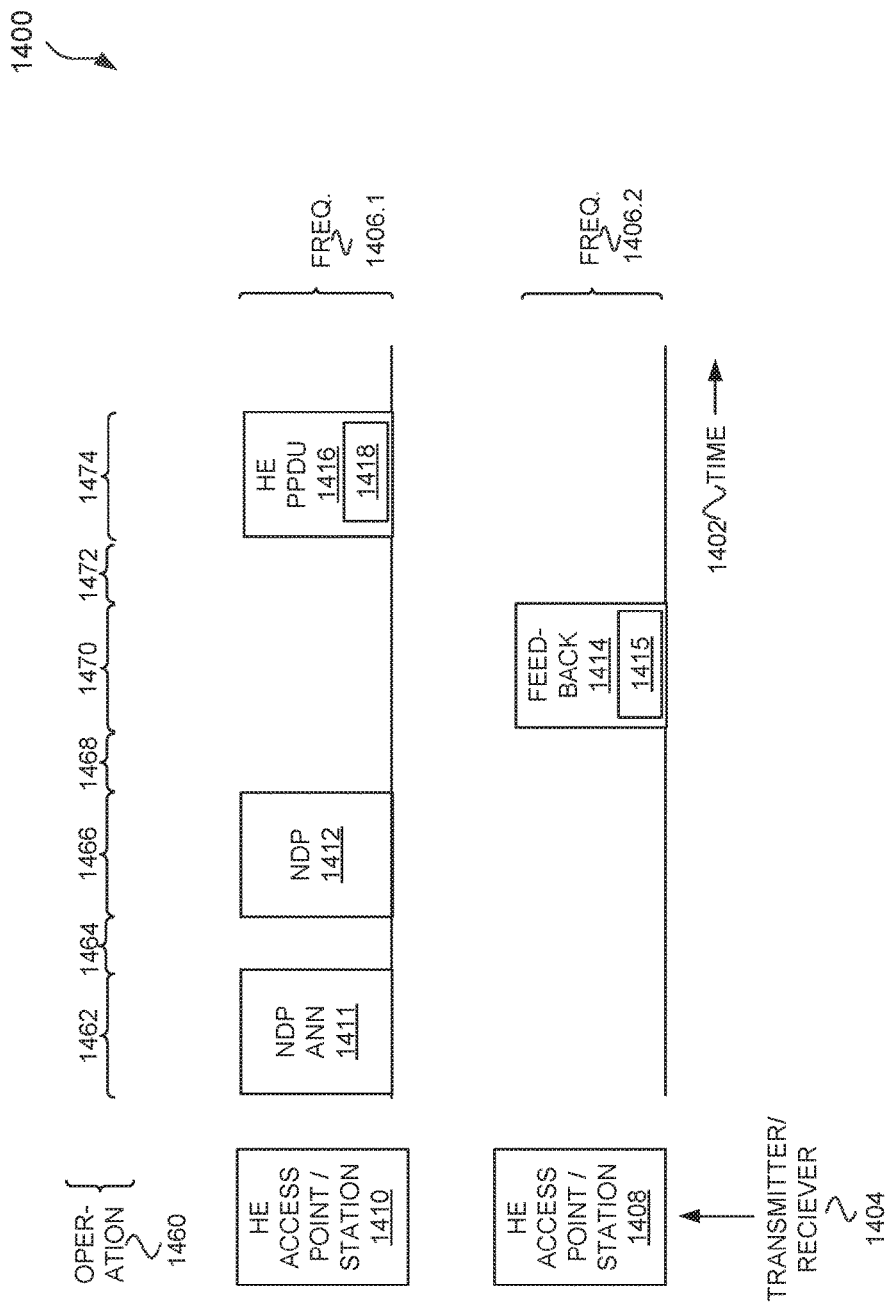
FIG. 14 illustrates a method for beamforming smoothness and indication in accordance with some embodiments.

FIG. 14 illustrates a method 1400 for beamforming smoothness and indication in accordance with some embodiments. Illustrated in FIG. 14 is time 1402 along a horizontal axis, transmitter/receiver 1404, frequency 1406, and operations 1460 along the top. The frequency 1406 may be a channel, e.g., an RU, bandwidth, etc. The frequency 1406.1 and frequency 1406.2 may be a same channel or different channels.

Optionally, the method 1400 may begin with the HE access point/station 1410 contending for and gaining access to the wireless medium (not illustrated). Optionally, the method 1400 continues at operation 1462 with HE access point/station 1410 transmitting a NDP announcement 1411. The NDP announcement 1411 may include a schedule or indication of UL resources for the HE access point/station 1408 to use to transmit the feedback 1414. In some embodiments, there may be more than one HE access point/station 1408 providing feedback 1414. In some embodiments, the NDP 1412 may be transmitted on more than one frequency 1406, e.g., the NDP 1412 may be transmitted on each of 2, 4, 8, or 16 20 MHz channels.

The method 1400 continues at operation 1464 with the HE access point/station 1208 waiting a duration before transmitting, e.g, an SIRS.

The method 1400 continues at operation 1466 with HE access point/station 1410 transmitting a NDP 1412. HE access point/station 1408 receives the NDP 1412 (e.g., NDP 1301) and obtains (e.g., 1320) a channel matrix estimates across tones (e.g., channel matrix estimate across tones 1302) based on the NDP 1412.

HE access point/station 1408 may smooth (e.g., 1322) the channel matrix estimates across tones to reduce the noise effect (e.g., channel matrix estimate with reduced noise across tones 1304). The HE access point/station 1408 may calculate (e.g., 1324) beamforming vectors or matrixes (e.g., beamforming vectors or matrixes 1306) using the channel matrixes (e.g., channel matrix estimate with reduced noise across tones 1304). The calculation may use SVD.

The method 1400 continues at operation 1468 with the HE access point/station 1408 waiting a duration before transmitting, e.g., an SIFS duration.

The method 1400 continues at operation 1470 with HE access point/station 1408 transmitting the feedback 1414. The feedback 1414 includes information 1415. Information 1415 may be channel matrix estimate across tones 1302, channel matrix estimate with reduced noise across tones 1304, or beamforming vectors or matrixes 1306. In some embodiments, beamforming vectors or matrixes 1306 may be quantized. The feedback 1214, 1414 content usually has to be quantized for transmitting in a digital form. The beamforming vectors can be quantized without smoothing and be sent in the feedback 1214, 1414. The smoothing (e.g., smooth 1326 and/or smooth 1332) can be done by HE access point/station 1210 or 1410 of the feedback 1214, 1414.

The HE access point/station 1410 receives the feedback 1414. The HE access point/station 1410 may process the information 1415 to quantized beamforming vectors or matrixes 1316 or smoothed quantized beamforming vectors or matrixes 1318. For example, the HE access point/station 1410 may use one or more methods as described in conjunction with FIGS. 13 and 16.

The method 1400 continues at operation 1472 with the HE access point/station 1210 waiting a duration before transmitting, e.g., a SITS duration.

The method 1400 continues at operation 1474 with HE access point/station 1410 transmitting an HE PPDU 1416 using the beamformer vectors or matrixes (e.g., quantized beamforming vectors or matrixes 1316 or smoothed quantized beamforming vectors or matrixes 1318). HE PPDU 1416 may include a TxBF 1418 field, e.g., 802, 902, or 1002, and may include a smoothed field, e.g., 804, 904, and 1004.

In some embodiments, the HE access point/station 1408 may conduct channel smoothing on the received HE PPDU 1416 differently depending on whether the beamforming vectors or matrixes 1306 have been smoothed before quantization 1330, 1328 to generate quantized beamforming vectors or matrixes 1316. The HE access point/station 1408 may determine whether the beamforming vectors or matrixes 1306 have been smoothed based on one or both of the feedback 1414 (e.g., the processing the HE access point/station 1408 performed) and the TxBF 1418 field, which may indicate the processing that has been done in generating the quantized beamforming vectors or matrixes 1316 used to beamform the HE PPDU 1416.

Figure 15:
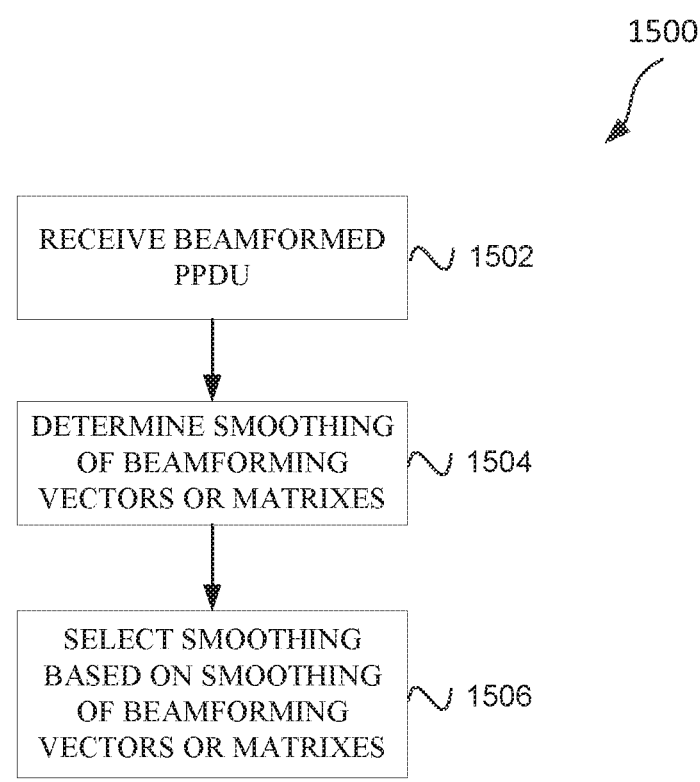
FIG. 15 illustrates a method for beamforming smoothness and indication in accordance with some embodiments.

FIG. 15 illustrates a method 1500 for beamforming smoothness and indication in accordance with some embodiments. The method 1500 begins at operation 1502 with receiving a beamformed PPDU. For example, HE access point/station 1408 may receive HE PPDU 1416, or HE access point/station 1208 may receive HE PPDU 1216.

The method 1500 continues at operation 1504 with determining smoothing of beamforming vectors or matrixes. For example, HE access point/station 1208 may determine the beamforming vectors or matrixes are smoothed to the same extent or similar extent as the quantized beatnforming vectors or matrixes 1316 that the HE access point/station 1208 transmitted to HE access point/station 1210 that transmitted the HE PPDU 1216, HE access point/station 1208 may assume that quantized beamforming vectors or matrixes 1316 was used or smoothed quantized beamforming vectors or matrixes 1318 was used for beamforming by HE access point/station 1208, since HE access point/station 1210 transmitted quantized beamforming vectors or matrixes 1316 or smoothed quantized beamforming vectors or matrixes 1318 to HE access point/station 1210. HE access point/station 1208 may examine TxBF 1218 field, e.g., 802, 902, or 1002, and may include a smoothed field, e.g., 804, 904, and 1004 to determine if beamforming was used and/or if the beamforming vectors or matrixes were smoothed. In some embodiments, only 1 bit is needed to indicate whether beamforming was used and the receiving station (HE access point/station 1208) determines the extent of the smoothing (e.g., 1606) based on the smoothing the receiving station performed based on receiving a NDP (e.g., 1211 or 1411).

HE access point/station 1408 may examine TXBF 1418 field, e.g., 802, 902, or 1002, which may include a smoothed field, e.g., 804, 904, and 1004 to determine if beamforming was used, and if beamforming was used whether the beamforming vectors or matrixes (e.g., 1306) were smoothed to quantized beamforming vectors or matrixes 1316 or smoothed quantized beamforming vectors or matrixes 1316 as described in conjunction with FIGS. 9-10.

The method 1500 continues at operation 1506 with selecting channel smoothing based on the smoothing of beamforming vectors or matrixes. For example, if the beamforming vectors or matrixes are quantized beamforming vectors or matrixes 1316 was used or smoothed quantized beamforming vectors or matrixes 1318, then a smoothing method may be used that assumes there are no breakpoints (250, 350). For example, a channel smoothing filter optimized for smoothed and beamformed channels may be used by the receiver (e.g., HE access point/station 1208 or 1408). If beamforming vectors or matrixes 1306 was used, then a smoothing may be used that assumes there may be breakpoints (250, 350).

Figure 16:
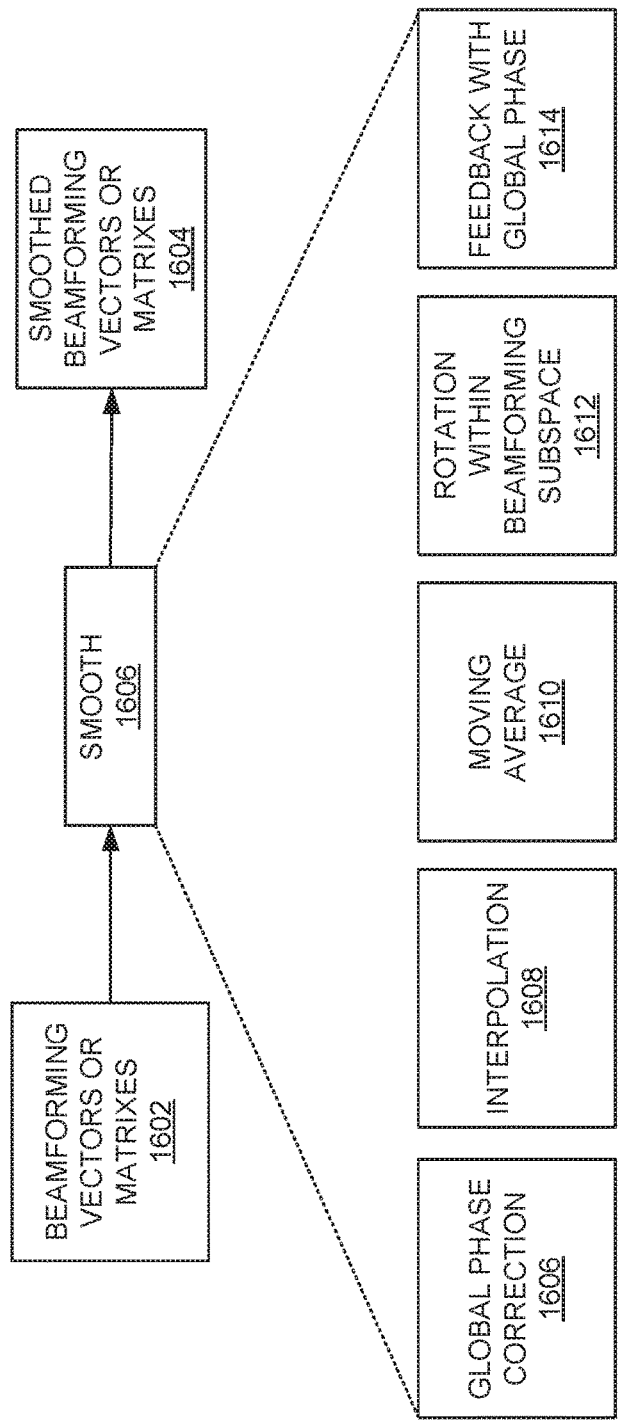
FIG. 16 illustrates a method for beamforming smoothness and indication in accordance with some embodiments.

FIG. 16 illustrates a method 1600 for beamforming smoothness and indication in accordance with some embodiments. The method 1600 begins with an HE access point 102 and/or HE station 104 receiving or processing beamforming vectors or matrixes 1602. For example, the HE access point 102 and/or HE station 104 may receive the beamforming vectors or matrixes 1602 as feedback 1214, 1414, or the HE access point 102 and/or HE station 104 may process data (e.g., channel matrix estimate across tones 1302) to generate the beamforming vectors or matrixes 1602. The method 1600 continues with the RE access point 102 and/or HE station 104 smoothing 1606 the beamforming vectors or matrixes 1602. For example, the HE access point 102 and/or HE station 104 may use global phase correction 1606, interpolation 1608, moving average 1610, rotation within beamforming subspace 1612, and feedback with global phase 1614 to generate smoothed beamforming vectors or matrixes 1604.

In some embodiments, the HE station 104 and/or HE access point 102 are configured to smooth 1606 to generate smoothed beamforming vectors or matrixes 1604. Some methods of smoothing 1606 may include smoothing of a beamformed channel. Some of the embodiments of the methods of smoothing 1606 can be classified into two categories: the first category is multiply a rotation matrix to the beamforming vectors at the breakpoints (e.g., 250 or 350), and this rotation matrix is constructed as a continuous function of the tone index, such that the beamformed channel around the breakpoint can be smoothed as much as possible. A LMMSE filter is then applied to the beamformed channel to minimize the mean squared error caused by additive noise. A second category of methods for smoothing 1606 is to divide the whole bandwidth into small sub-bands, and in each small sub-band, a LMMSE filter is designed to remove the additive noise, and in this way the breakpoint will not impact the tones in the adjacent sub-band. The methods global phase correction 1606, interpolation 1608, moving average 1610, rotation within beamforming subspace 1612, and feedback with global phase 1614 are of the first category.

There is no known method for calculating the rotation matrix described in the first category. The methods global phase correction 1606, interpolation 1608, moving average 1610, rotation within beamforming subspace 1612, and feedback with global phase 1614 use a systematic method that computes a good or optimal rotation matrix. Simulation results verify the performance gain, e.g., FIG. 5.

The rotation matrixes disclosed in conjunction with smooth 1606 may lessen or minimize the Euclidean distance between the beamforming vectors (e.g., beamforming vector $v_1$ 602, beamforming vector $v_2$ 604) around the breakpoint (e.g., 250 or 350; see FIGS. 2 and 3). The rotation matrix comes from the singular value decomposition of a matrix, which is the sum of the product of the beamforming matrixes around the breakpoint.

In some embodiments, the HE station 104 and/or HE access point 102 are configured to smooth 1606 using global phase correction 1606 to generate smoothed beamforming vectors or matrixes 1604. Global phase correction 1606 may be a method for smoothing 1606. The method 1606 may include the HE station 104 and/or HE access point 102 multiplying a scalar to the beamforming vectors or matrixes 1602, which in some embodiments does not change the fundamental direction of the beamforming vectors or matrixes 1602. In some embodiments, to change $v_2$ 602 (FIG. 6) to be closer (e.g., smaller d 606) to $v_1$ 604, HE station 104 and/or HE access point 102 are configured to multiply $v_2$ 602 with a global phase $e^{j\beta}$, e.g., Equation (23): $\tilde{v}_2 = e^{j\beta} v_2$, where $\beta = \text{phase}(v_2^H v_1) = -\text{phase}(v_1^H v_2)$ and phase (a) is the phase of complex number a, and where j is the imaginary unit number and e is the base of the natural logarithm. As described in conjunction with FIG. 6, $v_1$ 604 and $v_2$ 602 are beamforming vectors of the same data stream for two adjacent tones.

In some embodiments, the HE station 104 and/or HE access point 102 are configured to smooth 1606 using interpolation 1608 to generate smoothed beamforming vectors or matrixes 1604. Interpolation 1608 may be a method for smoothing 1606.

The HE station 104 and/or HE access point 102 identify the breaking points of beamforming vectors or matrixes 1602. For example, if $v_t, v_{t+1}, v_{t+2}, \ldots, V_{t+L-1}, V_{t+L}$ are the beamformer vectors (e.g., $v_1$ 604 and $v_2$ 602), the HE station 104 and/or HE access point 102 may determine a smoothness metric or metrics for pairs $(v_{t+1}, v_{t+2}), \ldots, (v_{t+L-2}, v_{t+L-1})$ of the vectors. For example, the HE station 104 and/or HE access point 102 may use one or more of magnitude of vector difference 610, angel between vectors 612, and simplified angel between two vectors 614. The HE station 104 and/or HE access point 102 may determine which pairs of vectors do not meet a smoothness requirement (e.g., a predetermined constant, a constant determined based on channel conditions, etc.). HE station 104 and/or HE access point 102 may smooth the vector by picking $v_t$ or $v_{t-M}$ as a starting point, where M is a positive (e.g., 1 or 2.) The HE station 104 and/or HE access point 102 may pick $v_{t+L}$, or $v_{t+L+M}$ as the ending point. The HE station 104 and/or HE access point 102 apply interpolation between $v_t$ (or $v_{t-M}$) and $v_{t+L}$ (or $v_{t+L+M}$). The HE station 104 and/or HE access point 102 may generate smoothed beamforming vectors or matrixes 1604 using this interpolation 1608 method to replace the original portions of the vectors where there were breakpoints, e.g., $v_{t+1}, v_{t+2}, \ldots, v_{t+L-1}$, which may be used to generate smoothed beamforming vectors or matrixes 1604.

In some embodiments, the HE station 104 and/or HE access point 102 may apply power normalization and orthogonalization to the interpolated beamforming vectors to generate smoothed beamforming vectors or matrixes 1604. Smoothed beamforming vectors or matrixes 1604 may be used for beamforming or feedback to another device to use for beamforming.

In some embodiments, the HE station 104 and/or HE access point 102 are configured to smooth 1606 using moving average 1610 to generate smoothed beamforming vectors or matrixes 1604. Moving average 1610 may be a method for smoothing 1606.

In some embodiments, the HE station 104 and/or HE access point 102 may apply power normalization and orthogonalization to the moving average 1610 generated beamforming vectors to generate smoothed beamforming vectors or matrixes 1604. Smoothed beamforming vectors or matrixes 1604 may be used for beamforming or feedback to another device to use for beamforming.

In some embodiments, the HE station 104 and/or HE access point 102 are configured to smooth 1606 using rotation within beamforming subspace 1612 to generate smoothed beamforming vectors or matrixes 1604. Rotation within beamforming subspace 1612 may be a method for smoothing 1606.

In the frequency domain channel response, if there exists a break point (e.g., 250, 350) in the beamforming vectors (e.g., $v_1$ 604 and $v_2$ 602) across the tones, the HE station 104 and/or HE access point 102 may try to smooth the break point as most as possible. The HE station 104 and/or HE access point 102 may evaluate the smoothness of the beamforming vectors using one or more of magnitude of vector difference 610, angel between vectors 612, and simplified angel between two vectors 614. In some embodiments, the HE station 104 and/or HE access point 102 may determine the smoothness based on a Euclidean distance between the beamforming vectors or the cross correlation (e.g., autocorrelation 204) between the beamforming vectors on adjacent tones.

The smaller the Euclidean distance or the higher the cross correlation, the smoother the beamforming vectors are. When the Euclidean distance at breaking points (e.g., 250, 350) is to be minimized, the HE station 104 and/or HE access point 102 may formulate the optimization problem as follows.

Equation (23): $\min \|V_{i-1} - V_i Q\|_F^2 + \|V_{i+1} - V_i Q\|_F^2$, such that $Q^H Q = I$, where $V_i \in \|\cdot\|_F$ denotes the Frobenius norm. The Equation (23) is equivalent to Equation (24): $\min \operatorname{Tr}((V_{i-1} - V_i Q)(V_{i-1} - V_i Q)^H) + \operatorname{Tr}((V_{i+1} - V_i Q)(V_{i+1} - V_i Q)^H)$, such that $Q^H Q = I$, where $\operatorname{Tr}(\cdot)$ is the trace of a matrix. The HE station 104 and/or HE access point 102 are configured to determine the objective function of Equation (24) as follows.

$$\begin{aligned}
&Tr((V_{i-1} - V_i Q)(V_{i-1} - V_i Q)^H) + Tr((V_{i+1} - V_i Q)(V_{i+1} - V_i)^H) = \\
&\quad Tr(V_{i-1}V_{i-1}^H - V_{i-1}Q^H V_i^H - V_i Q V_{i-1}^H + V_i Q Q^H V_i^H) + \\
&\quad Tr(V_{i+1}V_{i+1}^H - V_{i+1}Q^H V_i^H - V_i Q V_{i+1}^H + V_i Q Q^H V_i^H) = \\
&\quad 2M - Tr(V_{i-1}Q^H V_i^H + V_i Q V_{i-1}^H) + 2N - Tr(V_{i+1}Q^H V_i^H + V_i Q V_{i+1}^H) = \\
&\quad 4M - Tr(V_i^H V_{i-1}Q^H + V_{i-1}^H V_i Q) - Tr(V_i^H V_{i+1}Q^H + V_{i+1}^H V_i Q) = \\
&\quad 4M - Tr((V_i^H V_{i-1} + V_i^H V_{i+1})Q^H) - Tr((V_{i-1}^H V_i + V_{i+1}^H V_i)Q) = \\
&\quad 4M - Tr(BQ^H) - Tr(B^H Q),
\end{aligned}$$

where B is defined as $B = V_i^H V_{i+1} + V_i^H V_{i+1}$ and M is the number of antennas of HE access point 102 (Equation 26).

In accordance with Equation (26), HE station 104 and/or HE access point 102 can rewrite the optimization Equation (24) as follows.

Equation (27): $\max \operatorname{Tr}(BQ^H) - \operatorname{Tr}(B^H Q)$, such that $Q^H Q = I$.

HE station 104 and/or HE access point 102 may use SVD to derive from Equation (27) the following.

$$Tr(BQ^H) - Tr(B^H Q) = Tr(UDV^H Q^H) - Tr(VDU^H Q) = \quad \text{Equation (28)}$$
$$Tr(V^H Q^H U D) - Tr(U^H Q V D) = Tr(WD) + Tr(W^H D),$$
where $UDV^H$ denotes the SVD of $B$ and $$W = V^H Q^H U. \quad \text{Equation (29)}$$

Based on the results in Equation (29), Equation (27) can be rewritten (e.g., by HE station 104 and/or HE access point 102) as Equation (30) as follows.

$\max \operatorname{Tr}(WD) + \operatorname{Tr}(W^H D)$, such that $W^H W = I$ and $Q = UW^H V^H$.

Since the matrix D is a diagonal matrix, whose diagonal elements are the singular values of matrix B, Equation (30) is equivalent to Equation (31) as follows.

$\operatorname{Max} \sum_{i=1}^{M} W_{i,i} D_i + \sum_{i=1}^{M} \overline{W}_{i,i} D_i$, such that $W^H W = I$, $Q = UW^H V^H$, and $\sum_{j=1}^{M} |W_{i,j}|^2 = 1$, $i = 1, \ldots, M$, where $W_{i,j}$ is the (i, j)th element of the matrix W, $\overline{W}_{i,i}$ is the complex conjugate of $W_{i,i}$, $D_i$ is the ith diagonal element of matrix D, and the constraint in Equation (31) is due to the fact that W is a unitary matrix. An upper bound for Equation (31) is given by Equation (32) as follows.

$\sum_{i=1}^{M} W_{i,i} D_i + \sum_{i=1}^{M} (W_{i,i})^* D_i \leq 2 \sum_{i=1}^{M} D_i$, and this upper bound can be achieved by the HE station 104 and/or HE access point 102 setting $W = I$, thus the optimal Q that maximizes Equation (31) is calculated as follows.

$$Q^* = UV^H. \quad \text{(Equation (33))}$$

Since Equation (31) and Equation (23) are equivalent to one another, Q* is also the optimal solution to Equation (23). In some embodiments, the HE station 104 and/or HE access point 102 are configured to smooth 1606 using rotation within beamforming subspace 1612 (e.g., using Equation (33)) to generate smoothed beamforming vectors or matrixes 1604.

In some embodiments, the HE station 104 and/or HE access point 102 are configured to smooth 1606 using feedback with global phase 1614 to generate smoothed beamforming vectors or matrixes 1604. Rotation within beamforming subspace 1612 may be a method for smoothing 1606.

The ideal beamforming matrix V and V's quantized version (e.g., quantize 1330)

The ideal beamforming matrix V is defined by Equation (34). V may be determined based on channel matrix H, which is estimated from a channel sounding (e.g., NDP 1301 or HE NDP).

$$V = \begin{bmatrix} v_{11} & & v_{1N} \\ \vdots & \ldots & \vdots \\ v_{M1} & & v_{MN} \end{bmatrix}, \quad \text{Equation (34)}$$

where N is the number of tones (or symbols), and M is the number of antenna.

$$V \approx \begin{bmatrix} e^{j\hat{\theta}_1} \begin{bmatrix} \hat{v}_{11} \\ \vdots \\ \hat{v}_{M1} \end{bmatrix} & \ldots & e^{j\hat{\theta}_N} \begin{bmatrix} \hat{v}_{1N} \\ \vdots \\ \hat{v}_{MN} \end{bmatrix} \end{bmatrix}, \quad \text{Equation (35)}$$

where $e^{j\hat{\theta}_N}$ is a phase shift for column N.

$$V \approx \left[ \begin{bmatrix} \hat{v}_{11} \\ \vdots \\ \hat{v}_{M1} \end{bmatrix} \cdots \begin{bmatrix} \hat{v}_{1N} \\ \vdots \\ \hat{v}_{MN} \end{bmatrix} \right] \begin{bmatrix} e^{j\hat{\theta}_1} & & \\ & \ddots & \\ & & e^{j\hat{\theta}_N} \end{bmatrix}.$$ Equation (36)

$$\hat{V} = \left[ \begin{bmatrix} \hat{v}_{11} \\ \vdots \\ \hat{v}_{M1} \end{bmatrix} \cdots \begin{bmatrix} \hat{v}_{1N} \\ \vdots \\ \hat{v}_{MN} \end{bmatrix} \right],$$ Equation (37)

where $\hat{V}$ is the quantized V.

Equation (38): $y = H\hat{V}x + n$, where n is Gaussian noise, y is the received signal with dimension of the number of receive antennas, and x is defined in Equation (39).

$$x = \begin{bmatrix} e^{j\alpha_1} & & \\ & \ddots & \\ & & e^{j\alpha_N} \end{bmatrix} s.$$ Equation (39)

$\hat{V}$ (Equation (37)) is not the same as the ideal beamforming matrix V. For each data stream, e.g., n-th data stream, an arbitrary phase $\alpha_n$ may be applied to the input data of the n-th data symbol, $s_n$. Each applied beamforming vector (e.g., $$\begin{bmatrix} \hat{v}_{1N} \\ \vdots \\ \hat{v}_{MN} \end{bmatrix}$$

of Equation (37)) of the beamforming matrix $\hat{V}$ can differ from the ideal beamforming, vector V (Equation (34)) by a global phase e.g. $\hat{\theta}_n$ or $\alpha_n$. If channel smoothing at the receiver (e.g., HE station 104 and/or HE access point 102) is not used, this does not cause a problem, in accordance with some embodiments. Since the receiver directly estimates the aggregated beamformed channel with the global phases via the channel training signals coming with the data, the global phase can be arbitrary and does not need to be part of the feedback. For example, the transmitter (e.g., HE access point or HE station 104) does not need a precise beamforming vector and any vector different from the ideal V by a global phase is good enough. In some embodiments in accordance with WiFi or WiMAX feedback does not include global phases. In some embodiments, $\hat{V}$ may provide less than optimal performance when channel smoothing is done across the tones at the receiver and the global phase is not known.

If we check the continuity of the beamformed channel across frequency, disruptive beamforming vectors or matrixes can cause disruptions in frequency (e.g., breakpoints 250, 350, and 1750) and degrade the channel smoothing.

Figure 17:
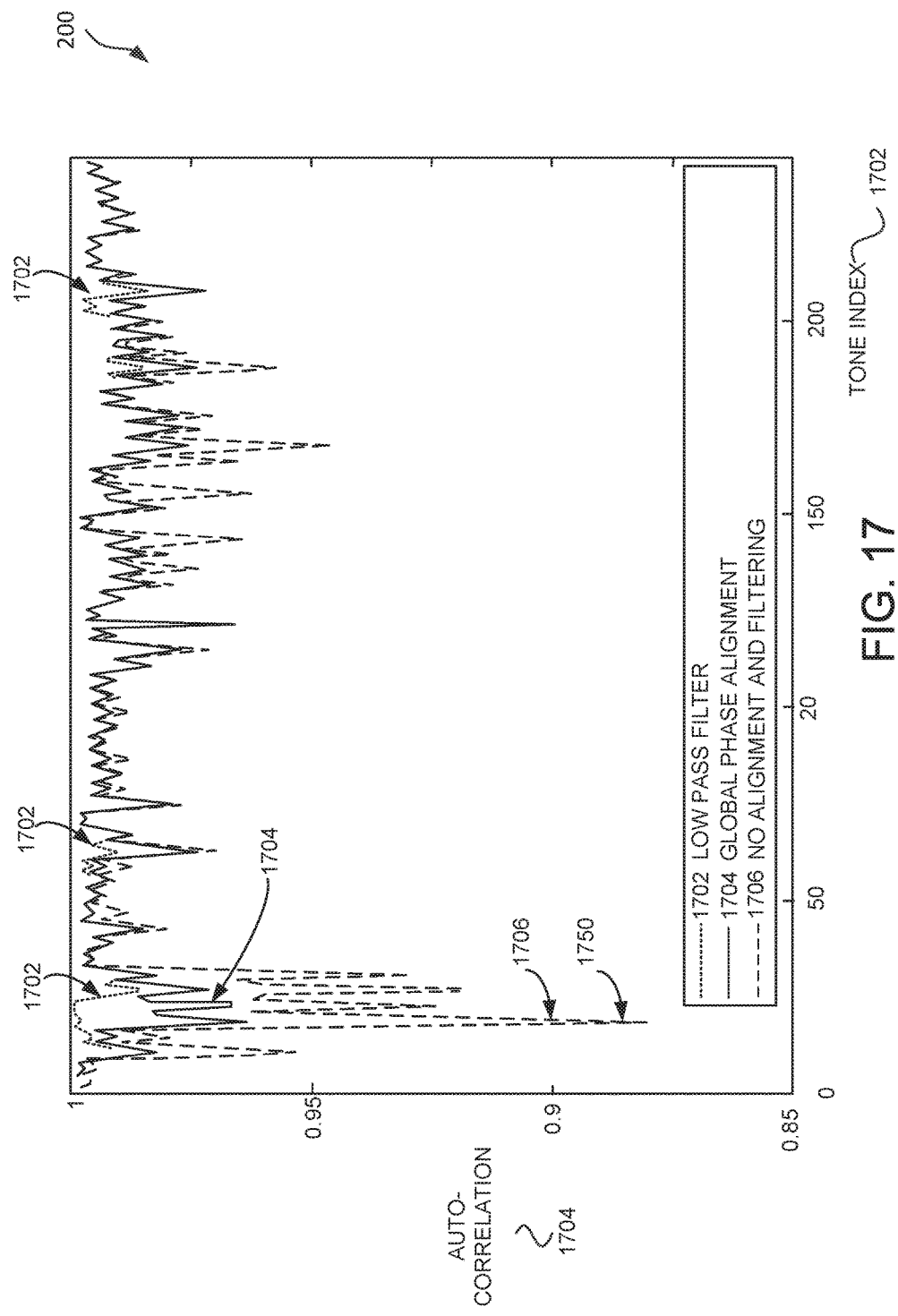
FIG. 17 illustrates the results of a simulation for beamforming vector disruptions across frequency for quantization methods in accordance with some embodiments.
Figure 18:
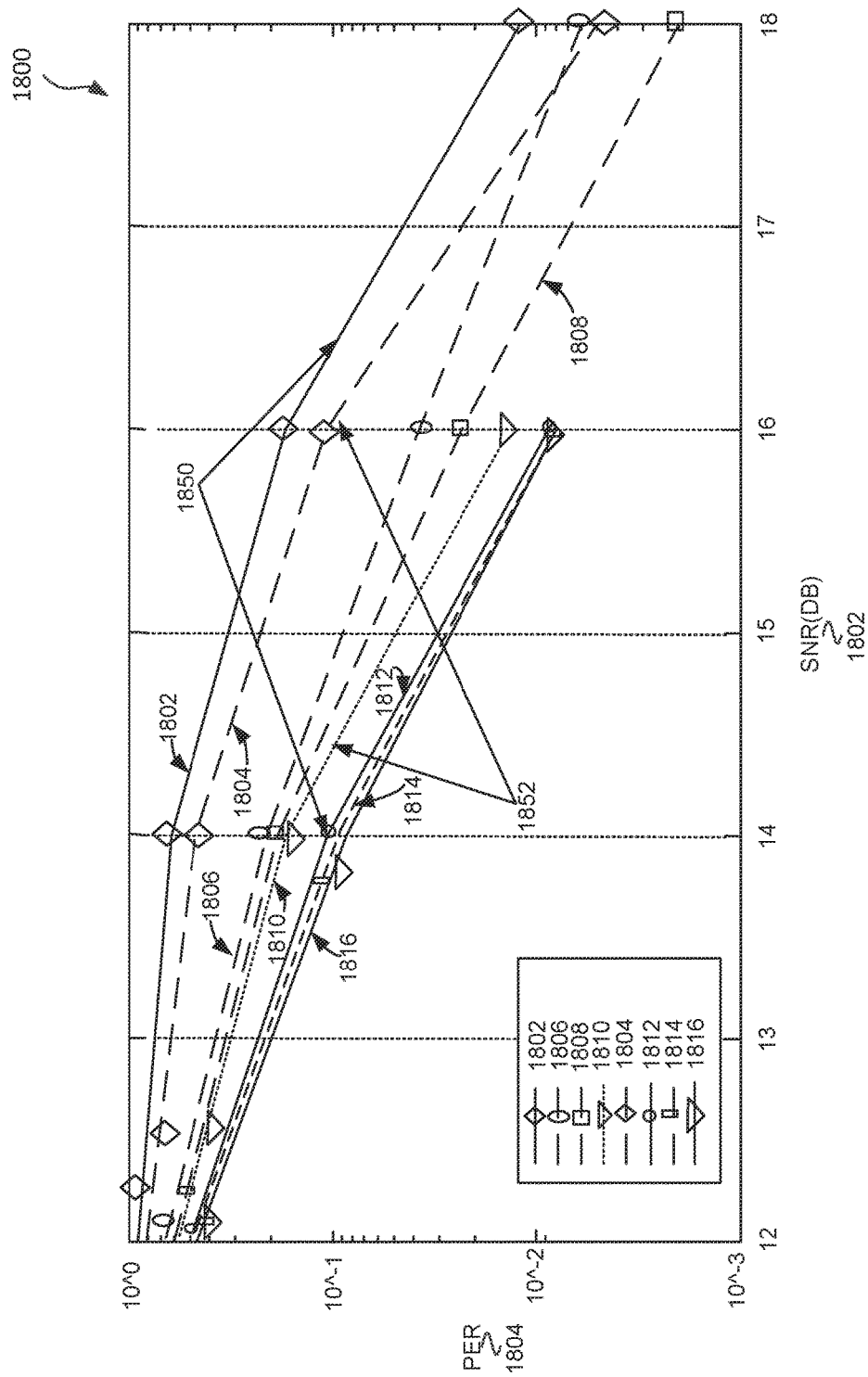
FIG. 18 illustrates the results of a simulation for performance degradation of modulation and coding scheme (MCS) 7 for quantization methods without smoothing at the transmitter in accordance with some embodiments.
Figure 19:
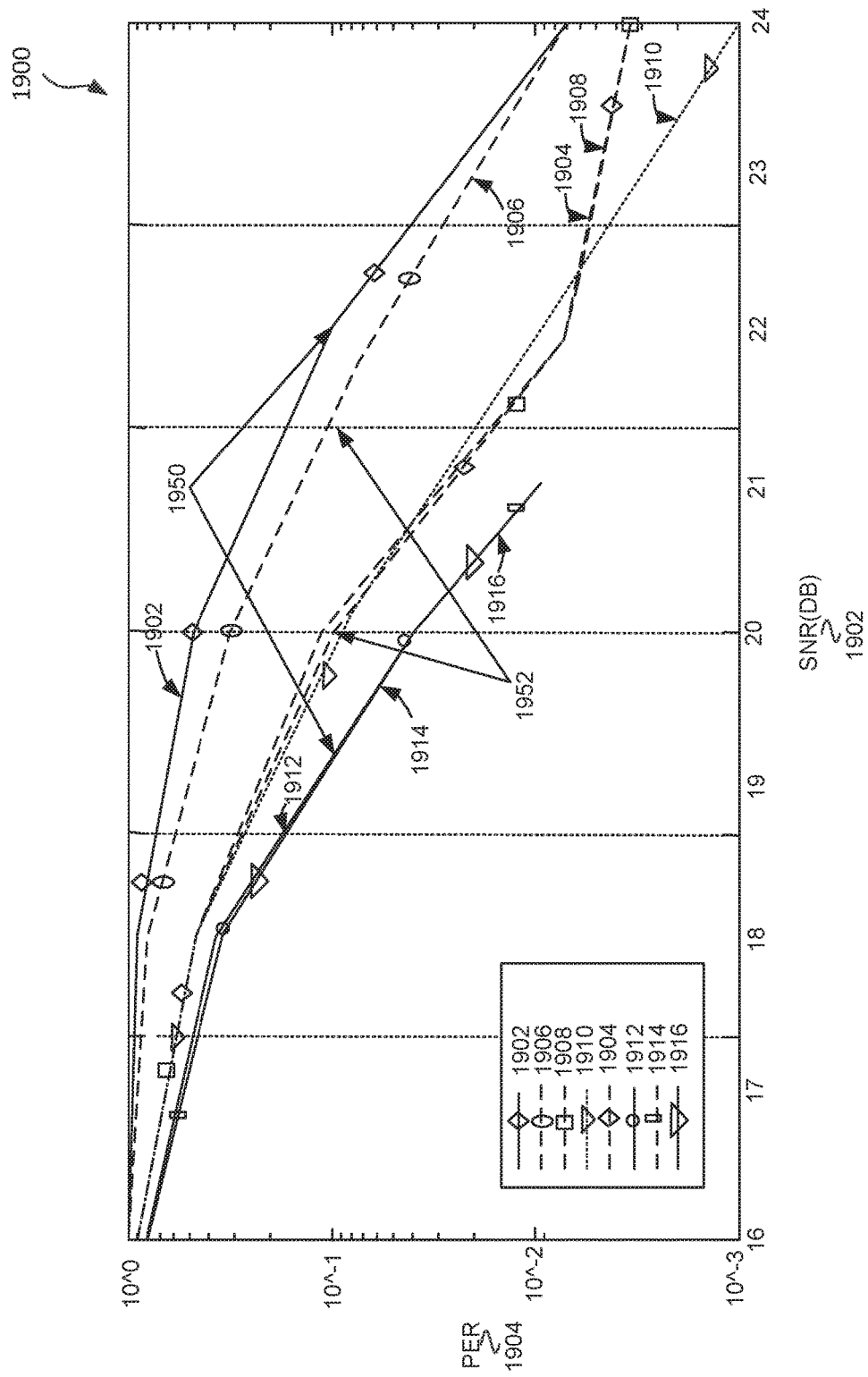
FIG. 19 illustrates the results of a simulation for performance degradation of MCS 9 for quantization methods without smoothing at the transmitter in accordance with some embodiments.

FIGS. 17-19 are disclosed in conjunction with FIG. 16. FIG. 17 illustrates the results of a simulation for beamforming vector disruptions across frequency for quantization methods in accordance with some embodiments. Illustrated in FIG. 17 is auto-correlation 1704 along a vertical axis and tone index 1702 along a horizontal axis. Four LTFs were used for the simulation.

Breakpoint 1750 illustrates a disruption across frequency for no alignment and filtering 1706 line. Global phase alignment 1704 line illustrates a correlation across tones of the tone index 1702 when a global phase alignment is used. Low pass filter 1702 line illustrates a correlation across tones of the tone index 1702 when a low pass filter (not illustrated) is used.

FIG. 18 illustrates the results of a simulation for performance degradation of modulation and coding scheme (MCS) 7 for quantization methods without smoothing at the transmitter in accordance with some embodiments.

Illustrated in FIG. 18 is SNR (dB) 1802 along a horizontal axis and PER 1804 along a vertical axis. The simulation was performed with MCS 7, four transmit antenna, two receive antenna, and 4 bit quantization, and $N_g=4$.

Illustrated in FIG. 18 is no beamformer smoothing, linear interpolation (1×LTF) 1804 line, Global phase correlation and channel smoothing (1×LTF) 1806 line, beamformer smoothing (linear) and channel smoothing (1×LTF) 1808 line, beamformer smoothing (iterative SVD) and channel smoothing (1×LTF) 1810 line, no beamformer smoothing and no channel smoothing (4×LTF) 1802 line, global phase correction and channel smoothing (4×LTF) 1812 line, beamformer smoothing (linear) and channel smoothing (4×LTF) 1816 line, and beamformer smoothing (iterative SVD) and channel smoothing (4×LTF) 1814 line.

As illustrated a 1.6 dB gain for 1×LTF at 1852 for using beamforming smoothing (line 1804 compared with line 1810). As illustrated a 2.5 dB gain for 4×LTF at 1850 for using beamformer smoothing (line 1802 compared with line 1816).

FIG. 19 illustrates the results of a simulation for performance degradation of MCS 9 for quantization methods without smoothing at the transmitter 1900 in accordance with some embodiments.

Illustrated in FIG. 19 is SNR (dB) 1902 along a horizontal axis and PER 1904 along a vertical axis. The simulation was performed with MCS 9, four transmit antenna, two receive antenna, and 4 bit quantization, and $N_g=4$.

Illustrated in FIG. 19 is no beamformer smoothing and no channel smoothing (1×LTF) 1906 line; global phase correction and channel smoothing (1×LTF) 1904 line; beamformer smoothing (linear) and channel smoothing (1×LTF) 1906 line; beamformer smoothing (iterative SVD) and channel smoothing (1×LTF) 1910 line; no beamformer smoothing and no channel smoothing (4×LTF) 1902 line; global phase correction and channel smoothing (4×LTF) 1912 line; beamformer smoothing (linear) and channel smoothing (4×LTF) 1914 line; and, beamformer smoothing (iterative SVD) and channel smoothing (4×LTF) 1916 line.

As illustrated a 1.4 dB gain for 1×LTF at 1952 for using beamforming smoothing (line 1906 compared with line 1904). As illustrated a 2.5 dB gain for 4×LTF at 1950 for using beamformer smoothing (line 1902 compared with line 1916).

The receiver (e.g., HE station 104 and/or HE access point 102) generates smooth beamforming matrixes (e.g., smooth beamforming vectors or matrixes 1310, quantized beamforming vectors or matrixes 1316, or smoothed quantized beamforming vectors or matrixes 1318) and transmits them back to the transmitter of the NDP 1311 (e.g., HE access point/station 1208 transmits feedback 1214 to HE access point/station 1210) without ambiguity regarding undetermined global phases. For example, the global phase $e^{j\hat{\theta}_N}$ of each beamforming vector $$\begin{bmatrix} \hat{v}_{1N} \\ \vdots \\ \hat{v}_{MN} \end{bmatrix}$$

in the beamforming matrix $\hat{V}$ is also part of the feedback (e.g., feedback 1214). The receiver of the NDP 1301 first generates beamforming matrixes smooth across frequency using a smoothing method disclosed herein or another smoothing method. The receiver then quantizes the smooth beamforming matrixes (e.g., quantize 1330). In some embodiments, the global phases $\hat{\theta}_n$ are calculated from the channel matrixes (e.g., channel matrix estimate across tones 1302) or beamforming matrixes (e.g., beamforming vectors or matrixes 1306), using Givens rotations, but the global phases $\hat{\theta}_n$ are not included in the feedback. In some embodiments, the global phases $\hat{\theta}_n$ are quantized to generate smooth quantized beamforming vectors or matrixes 1318 and are included as part of the feedback 1214. The transmitter (e.g., HE access point/station 1210 of FIG. 12) may uniquely determine the beamforming vectors or matrixes to use to transmit a bearnforrned PPDU to the receiver (e.g., HE access point/station 1208). At the transmitter, the global phases are applied such that the smooth beamforming matrixes are reconstructed in accordance with the way the receiver generated the smooth beamforming matrixes.

In some embodiments, a compressed V matrix is determined. For example, a compressed V matrix may be determined in accordance with one or more techniques described in communication standards such as IEEE 802.11.

In some embodiments, the feedback 1214 includes a compressed V matrix and a feedback quantity for removing the ambiguity of the global phase.

In some embodiments, one quantized Given angle is included in the feedback 1214 for each vector of the compressed beamforming matrix V, e.g., beamforming vectors or matrixes 1312, smooth beamforming vectors or matrixes 1310, quantized beamforming vectors or matrixes 1316, or smooth quantized beamforming vectors or matrixes 1318.

In some embodiments, for a 4×2 (4 transmit antennas) beamforming matrix, the feedback 1214 includes 10 Givens angles. In some embodiments, for a 4×2 beamforming matrix, the feedback 1214 includes 12 Givens angles, where the two additional Givens angles are for two global phases. By including the additional global phase angles, the receiver of the feedback 1214 may be able to uniquely determine the beamforming matrix V from the compressed beamforming matrix V.

In some embodiments, the quantization resolution of the global phase can be lower with the extra Givens angles. For example, some embodiments use 7 bits and 5 bits (alternatively, 9 bits and 7 bits, respectively) quantization per angle for two types of Givens angles in each beamforming, matrix. In some embodiments with the additional Givens angles, the global phase may need only 3-5 bits (alternatively, 5-7 bits) per angle. The additional feedback 1214 overhead of the additional Givens angles is relatively small for larger numbers of transmit antennas. For example, for 8×2 (8 transmit antennas) beamforming matrix, some embodiments use 26 Givens angles, and some embodiments with the extra Givens angles use 28 Givens angles. The increase is 7.7% for the extra Givens angles.

Figure 20:
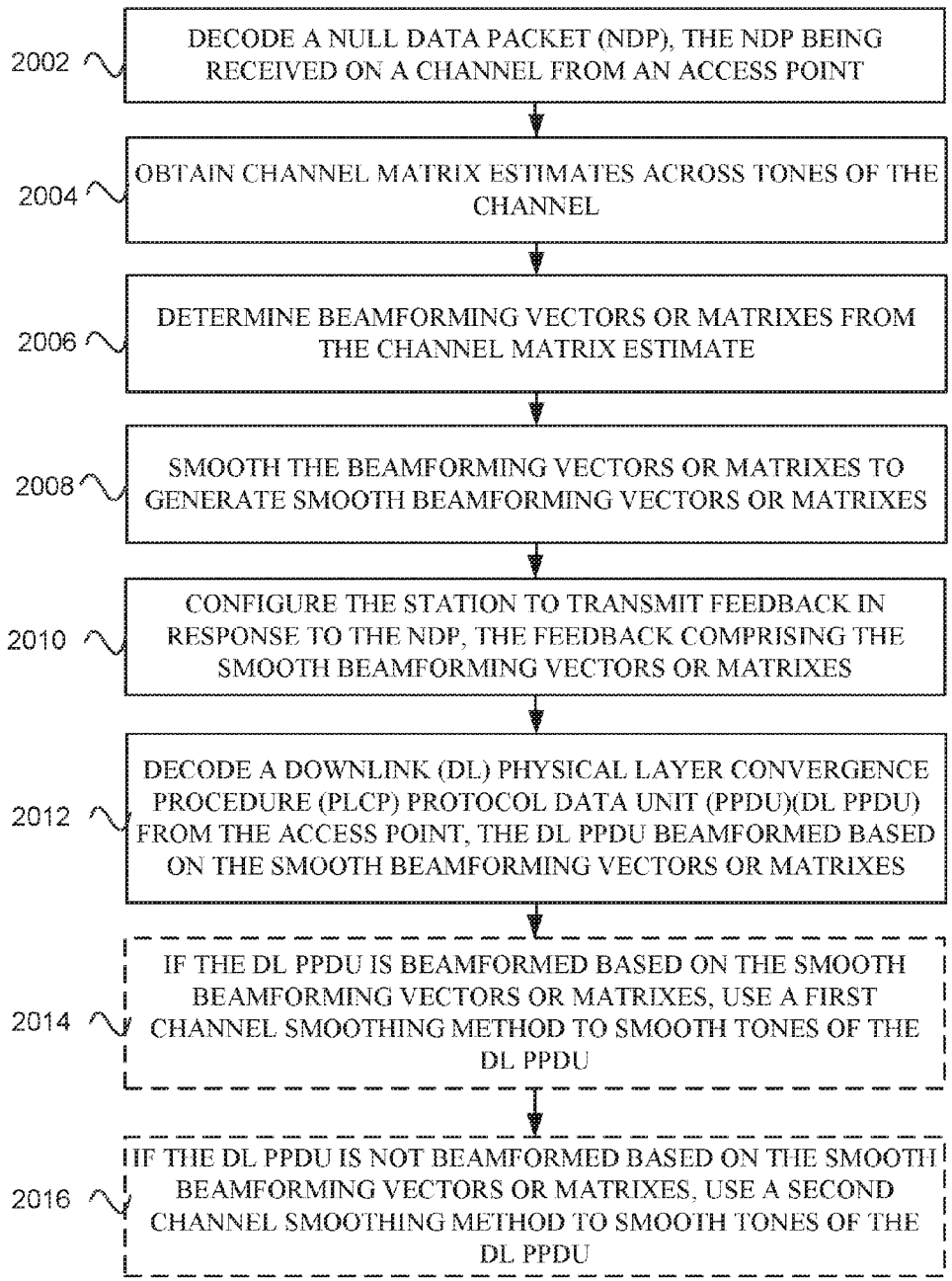
FIG. 20 illustrates a method for beamforming smoothness and indication in accordance with some embodiments.

FIG. 20 illustrates a method 2000 for beamforming smoothness and indication in accordance with some embodiments. The method 2000 begins at operation 2002 with decoding a NDP, the NDP being received on a channel from an access point. For example, HE access point/station 1208 may decode NDP 1212, or HE access point/station 1408 may decode NDP 1412.

The method 2000 continues at operation 2004 with obtaining channel matrix estimates across tones of the channel. For example, the HE access point/station 1208 or 1408 may obtain 1320 channel matrix estimates across tones 1302 as described in conjunction with FIG. 13.

The method 2000 continues at operation 2006 with determining beamforming vectors or matrixes from the channel matrix estimate. For example, HE access point/station 1208 or 1408 may calculate 1324 beamforming vectors or matrixes as described in conjunction with FIG. 13.

The method 2000 continues at operation 2008 with smoothing the beamforming vectors or matrixes to generate smooth beamforming vectors or matrixes. For example, HE access point/station 1208 or 1408 may smooth 1326 beamforming vectors or matrixes 1306 to generate smooth beamforming vectors or matrixes 1310. In some embodiments, the method 2000 may include quantizing the smooth beamforming vectors or matrixes to generate quantized smooth beamforming vectors or matrixes, e.g., HE access point/station 1208 or 1408 may quantize 1330 smooth beamforming vector or matrixes 1310 or beamforming vectors or matrixes 1312 to generate quantized beamforming vectors or matrixes 1316.

The method 2000 continues at operation 2010 with configuring the station to transmit feedback in response to the NDP, the feedback comprising the smooth beamforming vectors or matrixes. For example, an apparatus of HE access point/station 1208 or 1408 may configure HE access point/station 1208 or 1408 to transmit the feedback 1214, 1414, respectively.

The method 2000 continues at operation 2012 with decoding a DL PPDU from the access point, the DL PPDU beamformed based on the smooth beamforming vectors or matrixes. For example, HE access point/station 1208 or 1408 may decode HE PPDU 1216, 1416, respectively, from HE access point/station 1210 or 1410, respectively.

Optionally, the method 2000 continues at operation 2014 with if the DL PPDU is beamformed based on the smooth beamforming vectors or matrixes, use a first channel smoothing method to smooth tones of the DL PPDU. For example, HE access point/station 1208 or 1408 may use a first channel smoothing method that assumes there are no breakpoints 250, 350, 1750.

Optionally, the method 2000 continues at operation 2016 with if the DL PPDU is not beamformed based on the smooth beamforming vectors or matrixes, use a second channel smoothing method to smooth tones of the DL PPM. For example, HE access point/station 1208 or 1408 may use a second channel smoothing method that assumes there may be breakpoints 250, 350, 1750.

One or more of the operations of method 2000 may be performed by an apparatus of a station (e.g., HE access point/station 1208 or 1408).

Figure 21:
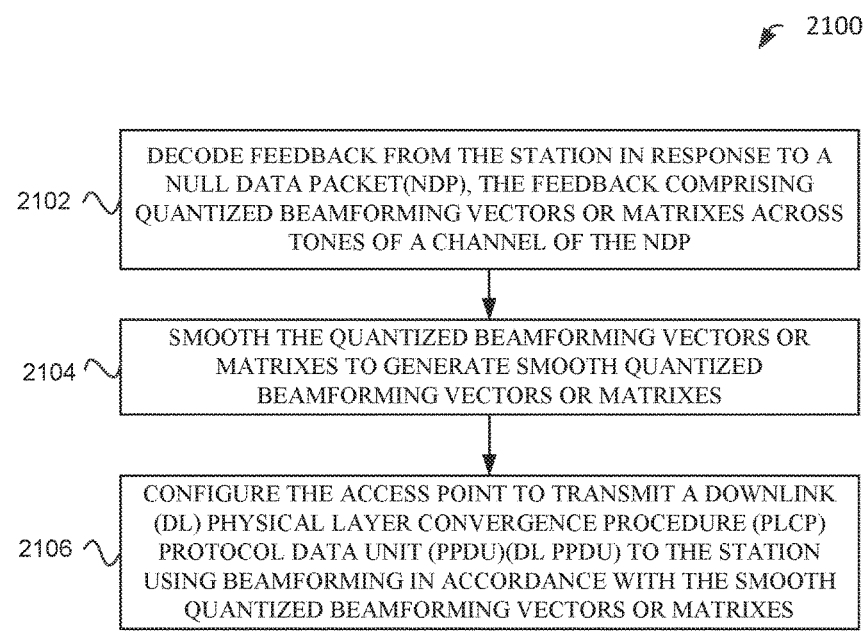
FIG. 21 illustrates a method for beamforming smoothness and indication in accordance with some embodiments.

FIG. 21 illustrates a method 2100 for beamforming smoothness and indication in accordance with some embodiments. The method 2100 begins at operation 2102 decoding feedback from the station in response to a NDP, the feedback comprising quantized beamforming vectors or matrixes across tones of a channel of the NDP. For example, HE access point/station 1210 or 1410 may decode feedback 1214 or 1414, respectively.

The method 2100 continues at operation 2104 with smoothing the quantized beamforming vectors or matrixes to generate smooth quantized beamforming vectors or matrixes. For example, HE access point/station 1210 or 1410 may smooth feedback 1214, 1414 (e.g., quantized beamforming vectors or matrixes 1316), respectively, to generate smooth quantized beamforming vectors or matrixes 1318.

The method 2100 continues at operation 2106 with configuring the access point to transmit a DL PPDU to the station using beamforming in accordance with the smooth quantized beamforming vectors or matrixes. For example, an apparatus of HE access point/station 1210 may configure HE access point/station 1210 to transmit HE PPDU 1218 in accordance with smooth quantized beamforming vectors or matrixes 1318. An apparatus of an access point may perform one or more of the operations of method 2100.

Figure 22:
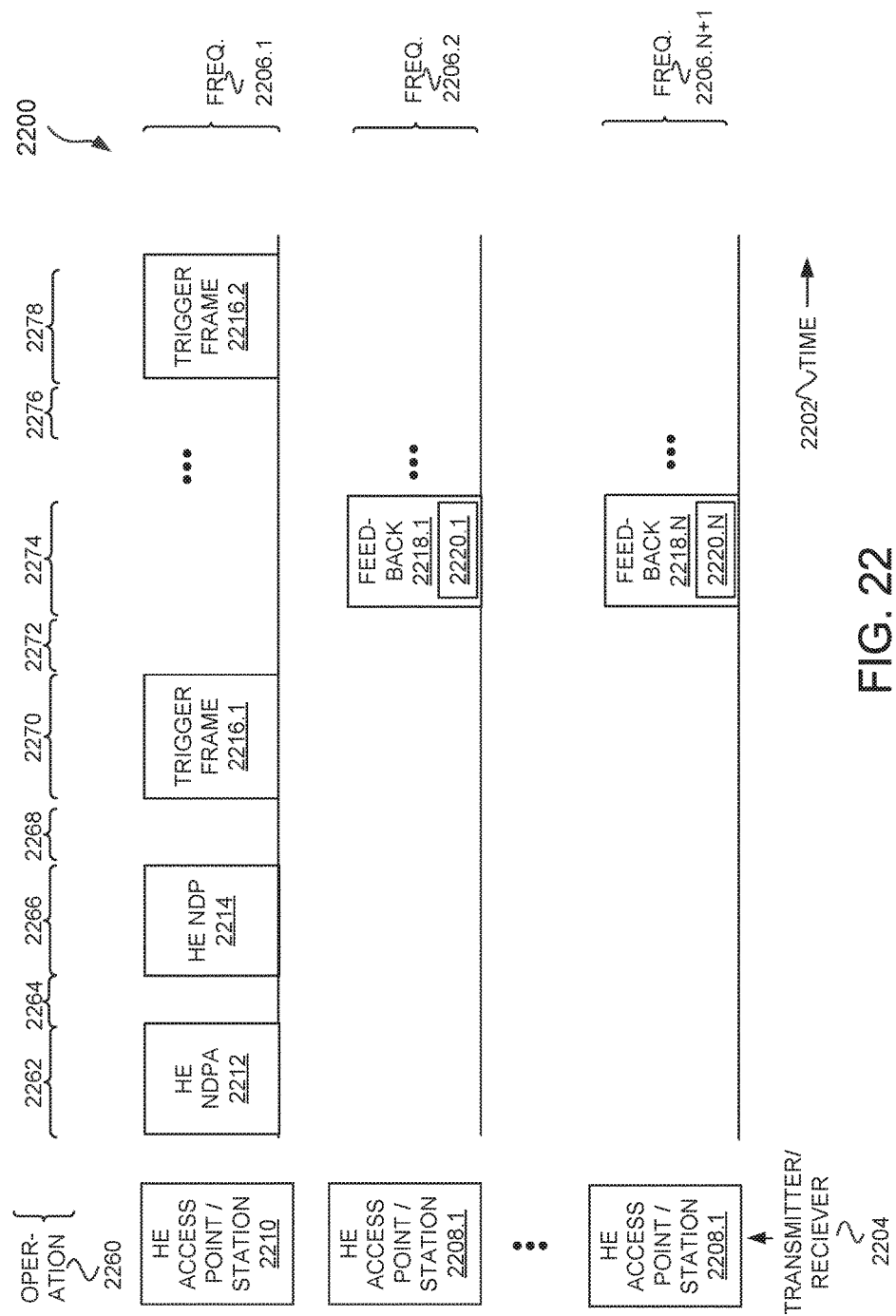
FIG. 22 illustrates a method for beamforming smoothness and indication in accordance with some embodiments.

FIG. 22 illustrates a method 2200 for beamforming smoothness and indication in accordance with some embodiments. Illustrated in FIG. 22 is time 2202 along a horizontal axis, transmitter/receiver 2204, frequency 2206, and operations 2260 along the top. The frequency 2206 may be a channel, e.g., an RU, bandwidth, etc. The frequency 2206.1 through frequency 1406.N+1 may be a same channel or different channels.

The method 2200 may begin with the HE access point/station 2210 contending for and gaining access to the wireless medium (not illustrated).

The method 2200 continues at operation 2262 with HE access point/station 2210 transmitting a HE NDP announcement (NDPA) 2212. The NDPA 2212 may indicate that a HE NDP 2214 is to follow SIFS time after the HE INTRA 2212. The HE INTRA 2212 may be transmitted on more than one 20 MHz channel in accordance with some embodiments.

The method 2200 continues at operation 2264 with the HE access point/station 2210 waiting a duration, e.g., a SIFS time. The method 2200 continues at operation 2266 with the HE access point/station 2210 transmitting a HE NDP 2214. In some embodiments, the HE NDP 2214 may be transmitted on more than one frequency 2206, e.g., the HE NDP 2214 may be transmitted on each of 2, 4, 8, or 16, 20 MHz channels. HE access point/station 2208.1 through 2208.N receive the HE NDP 2214 (e.g., NDP 1301) and obtain (e.g., 1320) a channel matrix estimates across tones (e.g., channel matrix estimate across tones 1302) based on the HE NDP 2214.

The method 2200 continues at operation 2268 with the HE access point/station 2210 waiting a duration, e.g., a SIFS time. The method 2200 continues at operation 2270 with the HE access point/station 2210 transmitting a trigger frame 2216.1. The trigger frame 2216.1 may include a schedule or indication of UL resources for the HE access point/station 2208.1 through HE access point 2208.N to use to transmit the feedback 2218.1 through 2218.N. The feedback 2218.1 through 2218.N may be feedback 1214, 1414 as described in conjunction with FIGS. 12 and 14, respectively.

The method 2200 continues at operation 2272 with the HE access point/station 2208.1 through 2208.N waiting a duration before transmitting, e.g, an SIFS.

HE access point/station 2208.1 through 2208.N may smooth (e.g., 1322) the channel matrix estimates across tones to reduce the noise effect (e.g., channel matrix estimate with reduced noise across tones 1304). HE access point/station 2208.1 through 2208.N may calculate (e.g., 1324) beamforming vectors or matrixes (e.g., beamforming vectors or matrixes 1306) using the channel matrixes (e.g., channel matrix estimate with reduced noise across tones 1304). The calculation may use SVD. HE access point/station 2208.1 through 2208.N may quantize (e.g., 1326, or 1328) the beamforming vectors or matrixes (e.g., 1306) or beamforming, vectors or matrixes that have been smoothed (e.g., 1312).

The method 2200 continues at operation 2274 with HE access point/station 2210.1 through 2210.N transmitting feedback 2218.1 through 2218.N, respectively. The feedback 2218.1 through 2218.N may include information 2220.1 through 2220.n, which may be information 1214 or 1414.

The HE access point/station 2210 receives the feedback 2218.1 through 2218.N. The HE access point/station 2210 may process the information 2220.1 through 2220.n to quantized beamforming vectors or matrixes 1316 or smoothed quantized beamforming vectors or matrixes 1318. For example, the HE access point/station 2210 may use one or more methods as described in conjunction with FIGS. 13 and 16.

The HE access point/station 2210 may wait a duration before transmitting, e.g., a SIFS duration. The HE access point/station 2210 may transmit one or more HE PPDUs using the beamforming based on the feedback 2218.1 through 2218.N. The HE PPDUs may include TxBF fields, e.g., 802, 902, or 1002, and may include a smoothed field, e.g., 804, 904, and 1004.

The method 2200 optionally continues with the HE access point/station 2210 waiting a duration (operation 2276) and transmitting another trigger frame 2216.2, one or more times to provide resources for additional HE access points/stations 2208 to transmit their feedback 2218. For example, there could be ten HE access points/stations 2208 and the first trigger frame 2216.1 provides resource allocations for the first five to transmit feedback 2218.1 through 2218.5, and then the second trigger frame 2216.2 provide resource allocations for the second five HE access points/stations 2208 to transmit feedback 2218.6 through 2218.10.

In some embodiments, the HE access points/stations 2208.1 through 2208.n may conduct channel smoothing on the received HE PPDUs differently depending on whether the beamforming vectors or matrixes 1306 have been smoothed before quantization 1330, 1328 to generate quantized beamforming vectors or matrixes 1316. The HE access points/stations 2208 may determine whether the beamforming vectors or matrixes 1306 have been smoothed based on one or both of the feedback 2218 (e.g., the processing the HE access point/station 2208 performed) and a TxBF field of the HE PPDU, which may indicate the processing that has been done in generating the quantized beamforming vectors or matrixes 1316 used to beamform the HE PPDU.

Figure 23:
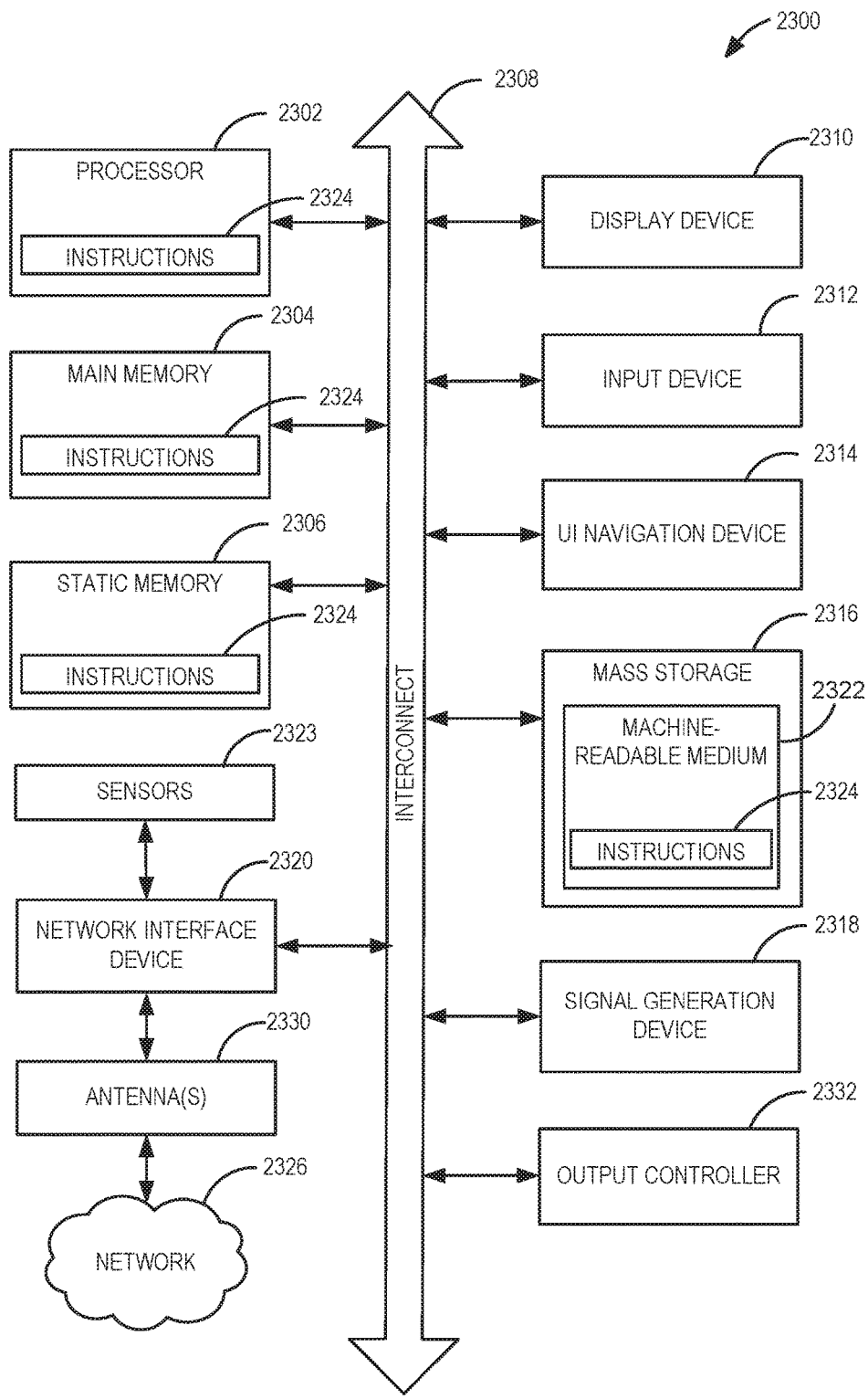
FIG. 23 illustrates a block diagram of an example machine upon which any one or more of the techniques (e.g., methodologies) discussed herein may perform.

FIG. 23 illustrates a block diagram of an example machine 2300 upon which any one or more of the techniques (e.g., methodologies) discussed herein may perform. In alternative embodiments, the machine 2300 may operate as a standalone device or may be connected (e.g., networked) to other machines. In a networked deployment, the machine 2300 may operate in the capacity of a server machine, a client machine, or both in server-client network environments. In an example, the machine 2300 may act as a peer machine in peer-to-peer (P2P) (or other distributed) network environment. The machine 2300 may be a master station 102, HE station 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constricted, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2300 may include a hardware processor 2302 (e.g., a central processing unit (CPU), a graphics processing unit (GPU), a hardware processor core, or any combination thereof), a main memory 2304 and a static memory 2306, some or all of which may communicate with each other via an interlink (e.g., bus) 2308. The machine 2300 may further include a display unit 2310, an alphanumeric input device 2312 (e.g., a keyboard and a user interface (UI) navigation device 2314 (e.g., a mouse). In an example, the display unit 2310, input device 2312 and UI navigation device 2314 may be a touch screen display.

The machine 2300 may additionally include a storage device (e.g., drive unit) 2316, a signal generation device 2318 (e.g., a speaker), a network interface device 2320, and one or more sensors 2321, such as a global positioning system (GPS) sensor, compass, accelerometer, or other sensor. The machine 2300 may include an output controller 2328, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 2302 and/or instructions 2324 may comprise processing circuitry.

The storage device 2316 may include a machine readable medium 2322 on which is stored one or more sets of data structures or instructions 2324 (e.g., software) embodying or utilized by any one or more of the techniques or functions described herein. The instructions 2324 may also reside, completely or at least partially, within the main memory 2304, within static memory 2306, or within the hardware processor 2302 during execution thereof by the machine 2300. In an example, one or any combination of the hardware processor 2302, the main memory 2304, the static memory 2306, or the storage device 2316 may constitute machine readable media.

While the machine readable medium 2322 is illustrated as a single medium, the term "machine readable medium" may include a single medium or multiple media (e.g., a centralized or distributed database, and/or associated caches and servers) configured to store the one or more instructions 2324.

The term "machine readable medium" may include any medium that is capable of storing, encoding, or carrying instructions for execution by the machine 2300 and that cause the machine 2300 to perform any one or more of the techniques of the present disclosure, or that is capable of storing, encoding or carrying data structures used by or associated with such instructions. Non-limiting machine readable medium examples may include solid-state memories, and optical and magnetic media.

Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 2324 may further be transmitted or received over a communications network 2326 using a transmission medium via the network interface device 2320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2320 may include one or more physical jacks (e.g., Ethernet, coaxial, or phone jacks) or one or more antennas to connect to the communications network 2326.

In an example, the network interface device 2320 may include a plurality of antennas to wirelessly communicate using at least one of single-input multiple-output (SIMO), multiple-input multiple-output (MIMO), or multiple-input single-output (MISO) techniques. In some examples, the network interface device 2320 may wirelessly communicate using Multiple User MIMO techniques. The term "transmission medium" shall be taken to include any intangible medium that is capable of storing, encoding or carrying instructions for execution by the machine 2300, and includes digital or analog communications signals or other intangible medium to facilitate communication of such software.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a station including: a memory; and processing circuitry couple to the memory, where the processing circuitry is configured to: decode a null data packet (NDP), the NDP being received on a channel from an access point; determine channel matrix estimates across tones of the channel based on the NDP; determine beamforming vectors or matrixes from the channel matrix estimate; smooth the beamforming vectors or matrixes to generate smooth beamforming vectors or matrixes; configure the station to transmit feedback in response to the NDP, the feedback including the smooth beamforming vectors or matrixes; and decode a downlink (DL) physical layer convergence procedure (PLCP) protocol data unit (PPDU)(DL PPDU) from the access point, the DL PPDU beamformed based on the smooth beamforming vectors or matrixes.

In Example 2, the subject matter of Example 1 optionally includes where the processing circuitry is further configured to: if the DL PPDU is beamformed based on the smooth beamforming vectors or matrixes, use a first channel smoothing method to smooth tones of the DL PPDU and if the DL PPDU is not beamformed based on the smooth beamforming vectors or matrixes, use a second channel smoothing method to smooth tones of the DL PPDU.

In Example 3, the subject matter of Example 2 optionally includes where the first channel smoothing method is Linear minimum mean square error (LMMSE).

In Example 4, the subject matter of any one or more of Examples 2-3 optionally include where the processing circuitry is further configured to: determine whether the DL is smoothed based on a probabilistic determination.

In Example 5, the subject matter of any one or more of Examples 1-4 optionally include where the processing circuitry is further configured to: quantize the smooth beamforming vectors or matrixes to generate quantized beamforming vectors or matrixes; and configure the station to transmit feedback in response to the NDP, the feedback including the quantized smooth beamforming vectors or matrixes.

In Example 6, the subject matter of any one or more of Examples 1-5 optionally include where the processing circuitry is further configured to: smooth the beamforming vectors or matrixes to generate smooth beamforming vectors or matrixes using one of the methods of the following group: global phase correction, interpolation, moving average, rotation within beamforming subspace, and feedback with global phase.

In Example 7, the subject matter of Example 6 optionally includes where the processing circuitry is further configured to: determine the DL PPDU is beamformed based on the quantized smooth beamforming vectors or matrixes, if the station transmitted feedback to the access point including the quantized smooth beamforming vectors or matrixes.

In Example 8, the subject matter of Example 7 optionally includes where the processing circuitry is further configured to: determine the DL PPDU is beamformed based on the quantized smooth beamforming vectors or matrixes, if the station transmitted feedback to the access point including the quantized smooth beamforming vectors or matrixes and the DL PPDU includes a field that indicates the DL PPDU is beamformed.

In Example 9, the subject matter of any one or more of Examples 5-8 optionally include where the feedback further comprises a phase angle of each beamforming vector of the smooth smooth beamforming vectors or matrixes.

In Example 10, the subject matter of any one or more of Examples 5-9 optionally include where the processing circuitry is further configured to: determine the DL PPDU is beamformed based on the quantized smooth beamforming vectors or matrixes, if a field of the DL PPDU indicates that smooth beamforming vectors or matrixes were used to beamform the DL PPDU.

In Example 11, the subject matter of any one or more of Examples 1-10 optionally include where the processing circuitry is further configured to: smooth the beamforming vectors or matrixes to generate smooth beamforming vectors or matrixes using one of the methods of the following group: global phase correction, interpolation, moving average, rotation within beamforming subspace, and feedback with global phase.

In Example 12, the subject matter of any one or more of Examples 1-11 optionally include where the processing circuitry is further configured to: determine the DL PPDU is not beamformed based on the smooth beamforming vectors or matrixes, if the DL PPDU comprises a field that indicates that the DL PPDU is not beamformed or the DL comprises a field that indicates the smooth beamforming vectors or matrixes were not used to beamform the DL PPDU.

In Example 13, the subject matter of any one or more of Examples 1-12 optionally include where the processing circuitry is further configured to: determine the DL PPDU is beamformed based on the smooth beamforming vectors or matrixes, if one or more fields of the DL PPDU indicate that smooth beamforming vectors or matrixes were used to beamform the DL PPDU.

In Example 14, the subject matter of any one or more of Examples 1-13 optionally include where the processing circuitry is further configured to: smooth the channel matrix estimates across tones to generate smoothed channel matrix estimates across tones; and determine beamforming vectors or matrixes from the smooth channel matrix estimates.

In Example 15, the subject matter of any one or more of Examples 1-14 optionally include ax station.

In Example 16, the subject matter of any one or more of Examples 1-15 optionally include transceiver circuitry coupled to the memory; and, one or more antennas coupled to the transceiver circuitry.

Example 17 is a non-transitory computer-readable storage medium that stores instructions for execution by one or more processors, the instructions to configure the one or more processors to cause an apparatus of a station to: decode a null data packet (NDP), the NDP being received on a channel from an access point; obtain channel matrix estimates across tones of the channel; determine beamforming vectors or matrixes from the channel matrix estimate; and smooth the beamforming vectors or matrixes to generate smooth beamforming vectors or matrixes; configure the station to transmit feedback in response to the NDP, the feedback including the smooth beamforming vectors or matrixes; and decode a downlink (DL) physical layer convergence procedure (PLCP) protocol data unit (PPDU)(DL PPDU) from the access point, the DL PPDU beamformed based on the smooth beamforming vectors or matrixes.

In Example 18, the subject matter of Example 17 optionally includes where the instructions to further configure the one or more processors to cause the apparatus of the station to: quantize the smooth beamforming vectors or matrixes to generate quantized beamforming vectors or matrixes; and configure the station to transmit feedback in response to the NDP, the feedback including the quantized smooth beamforming vectors or matrixes.

Example 19 is a method performed by an apparatus of a station, the method including: decoding a null data packet (NDP), the NDP being received on a channel from an access point; obtaining channel matrix estimates across tones of the channel; determining beamforming vectors or matrixes from the channel matrix estimate; and smoothing the beamforming vectors or matrixes to generate smooth beamforming vectors or matrixes; configuring the station to transmit feedback in response to the NDP, the feedback including the smooth beamforming vectors or matrixes; and decoding a downlink (DL) physical layer convergence procedure (PLCP) protocol data unit (PPDU)(DL PPDU) from the access point, the DL PPDU beamformed based on the smooth beamforming vectors or matrixes.

Example 20 is an apparatus of an access point including: a memory; and processing circuitry couple to the memory, where the processing circuitry is configured to: decode feedback from the station in response to a null data packet (NDP), the feedback including quantized beamforming vectors or matrixes across tones of a channel of the NDP; smooth the quantized beamforming vectors or matrixes to generate smooth quantized beamforming vectors or matrixes; and configure the access point to transmit a downlink (DL) physical layer convergence procedure (PLCP) protocol data unit (PPDU)(DL PPDU) to the station using beamforming in accordance with the smooth quantized beamforming vectors or matrixes.

In Example 21, the subject matter of Example 20 optionally includes the processing circuitry further configured to: encode the DL PPDU to comprise a field that indicates the DL PPDU is beamformed.

In Example 22, the subject matter of Example 21 optionally includes the processing circuitry further configured to: encode the DL PPDU to further comprise a second field to indicate the DL PPDU is beamformed based on the quantized beamforming vectors or matrixes.

In Example 23, the subject matter of any one or more of Examples 20-22 optionally include the processing circuitry further configured to: smooth the quantized beamforming vectors or matrixes to generate the smooth quantized beamforming vectors or matrixes using one of the methods of the following group: global phase correction, interpolation, moving average, and rotation within beamforming subspace.

In Example 24, the subject matter of any one or more of Examples 20-23 optionally include where the feedback further comprises a phase angle of each beamforming vector of the smooth beamforming vectors or matrixes, and where the smooth beamforming vectors or matrixes are compressed, and where the processing circuitry is further configured to: decompress the smooth beamforming vectors or matrixes using the phase angle of each beamforming vector of the smooth beamforming vectors or matrixes.

In Example 25, the subject matter of any one or more of Examples 20-24 optionally include transceiver circuitry coupled to the memory; and, one or more antennas coupled to the transceiver circuitry.

Example 26 is an apparatus of a station including: means for decoding a null data packet (NDP), the NDP being received on a channel from an access point; means for determining channel matrix estimates across tones of the channel based on the NDP; means for determining beamforming vectors or matrixes from the channel matrix estimate; means for smoothing the beamforming vectors or matrixes to generate smooth beam forming vectors or matrixes; means for configuring the station to transmit feedback in response to the NDP, the feedback including the smooth beamforming vectors or matrixes; and means for decoding a downlink (DL) physical layer convergence procedure (PLCP) protocol data unit (PPDU)(DL PPDU) from the access point, the DL PPDU beamformed based on the smooth beamforming vectors or matrixes.

In Example 27, the subject matter of Example 26 optionally includes if the DL PPDU is beamformed based on the smooth beamforming vectors or matrixes, means for using a first channel smoothing method to smooth tones of the DL PPDU; and if the DL PPDU is not beamformed based on the smooth beamforming vectors or matrixes, means for using a second channel smoothing method to smooth tones of the DL PPDU.

In Example 28, the subject matter of Example 27 optionally includes where the first channel smoothing method is Linear minimum mean square error (LMMSE).

In Example 29, the subject matter of any one or more of Examples 27-28 optionally include means for determining whether the DL is smoothed based on a probabilistic determination.

In Example 30, the subject matter of any one or more of Examples 26-29 optionally include means for quantizing the smooth beamforming vectors or matrixes to generate quantized beamforming vectors or matrixes; and means for configuring the station to transmit feedback in response to the NDP, the feedback including the quantized smooth beamforming vectors or matrixes.

In Example 31, the subject matter of any one or more of Examples 26-30 optionally include means for smoothing the beamforming vectors or matrixes to generate smooth beamforming vectors or matrixes using one of the methods of the following group: global phase correction, interpolation, moving average, rotation within beamforming subspace, and feedback with global phase.

In Example 32, the subject matter of Example 31 optionally includes means for determining the DL PPDU is beamformed based on the quantized smooth beamforming vectors or matrixes, if the station transmitted feedback to the access point including the quantized smooth beamforming vectors or matrixes.

In Example 33, the subject matter of Example 32 optionally includes means for determining the DL PPDU is beamformed based on the quantized smooth beamforming vectors or matrixes, if the station transmitted feedback to the access point including the quantized smooth beamforming vectors or matrixes and the DL PPDU includes a field that indicates the DL PPDU is beamformed.

In Example 34, the subject matter of any one or more of Examples 30-33 optionally include where the feedback further comprises a phase angle of each beamforming vector of the smooth smooth beamforming vectors or matrixes.

In Example 35, the subject matter of any one or more of Examples 30-34 optionally include means for determining the DL PPDU is beamformed based on the quantized smooth beamforming vectors or matrixes, if a field of the DL PPDU indicates that smooth beamforming vectors or matrixes were used to beamform the DL PPDU.

In Example 36, the subject matter of any one or more of Examples 26-35 optionally include means for smoothing the beamforming vectors or matrixes to generate smooth beamforming vectors or matrixes using one of the methods of the following group: global phase correction, interpolation, moving average, rotation within beamforming subspace, and feedback with global phase.

In Example 37, the subject matter of any one or more of Examples 26-36 optionally include means for determining the DL PPDU is not beamformed based on the smooth beamforming vectors or matrixes, if the DL PPDU comprises a field that indicates that the DL PPDU is not beamformed or the DL comprises a field that indicates the smooth beamforming vectors or matrixes were not used to beamform the DL PPDU.

In Example 38, the subject matter of any one or more of Examples 26-37 optionally include means for determining the DL PPDU is beamformed based on the smooth beamforming vectors or matrixes, if one or more fields of the DL PPDU indicate that smooth beamforming vectors or matrixes were used to beamform the DL PPDU.

In Example 39, the subject matter of any one or more of Examples 26-38 optionally include means for smoothing the channel matrix estimates across tones to generate smoothed channel matrix estimates across tones; and means for determining beamforming vectors or matrixes from the smooth channel matrix estimates.

In Example 40, the subject matter of any one or more of Examples 26-39 optionally include ax station.

In Example 41, the subject matter of any one or more of Examples 26-40 optionally include means for processing radio frequency signals coupled to means for storing and retrieving data; and, means for receiving and transmitting the radio frequency signals.

Example 42 is a non-transitory computer-readable storage medium that stores instructions for execution by one or more processors, the instructions to configure the one or more processors to cause an apparatus of an access point to: decode feedback from the station in response to a null data packet(NDP), the feedback including quantized beamforming vectors or matrixes across tones of a channel of the NDP; smooth the quantized beamforming vectors or matrixes to generate smooth quantized beamforming vectors or matrixes; and configure the access point to transmit a downlink (DL) physical layer convergence procedure (PLCP) protocol data unit (PPDU)(DL PPDU) to the station using beamforming in accordance with the smooth quantized beamforming vectors or matrixes.

In Example 43, the subject matter of Example 42 optionally includes where the instructions to further configure the one or more processors to cause the apparatus of the access point to: encode the DL PPDU to comprise a field that indicates the DL PPDU is beamformed.

In Example 44, the subject matter of any one or more of Examples 42-43 optionally include where the instructions to further configure the one or more processors to cause the apparatus of the access point to: encode the DL PPDU to further comprise a second field to indicate the DL PPDU is beamformed based on the quantized beamforming vectors or matrixes.

In Example 45, the subject matter of any one or more of Examples 42-44 optionally include where the instructions to further configure the one or more processors to cause the apparatus of the access point to: smooth the quantized beamforming vectors or matrixes to generate the smooth quantized beamforming vectors or matrixes using one of the methods of the following group: global phase correction, interpolation, moving average, and rotation within beamforming subspace.

In Example 46, the subject matter of any one or more of Examples 42-45 optionally include where the feedback further comprises a phase angle of each beamforming vector of the smooth beamforming vectors or matrixes, and where the instructions to further configure the one or more processors to cause the apparatus of the access point to: decompress the smooth beamforming vectors or matrixes using the phase angle of each beamforming vector of the smooth beamforming vectors or matrixes.

Example 47 is a method performed by an apparatus of an access point, the method including: decoding feedback from the station in response to a null data packet(NDP), the feedback including quantized beamforming vectors or matrixes across tones of a channel of the NDP; smoothing the quantized beamforming vectors or matrixes to generate smooth quantized beamforming vectors or matrixes; and configuring the access point to transmit a downlink (DL) physical layer convergence procedure (PLCP) protocol data unit (PPDU)(DL PPDU) to the station using beamforming in accordance with the smooth quantized beamforming vectors or matrixes.

In Example 48, the subject matter of Example 47 optionally includes the method further including: encoding the DL PPDU to comprise a field that indicates the DL PPDU is beamformed.

In Example 49, the subject matter of any one or more of Examples 47-48 optionally include the method further including: encoding the DL PPDU to further comprise a second field to indicate the DL PPDU is beamformed based on the quantized beamforming vectors or matrixes.

In Example 50, the subject matter of any one or more of Examples 47-49 optionally include the method further including: smoothing the quantized beamforming vectors or matrixes to generate the smooth quantized beamforming vectors or matrixes using one of the methods of the following group: global phase correction, interpolation, moving average, and rotation within beamforming subspace.

In Example 51, the subject matter of any one or more of Examples 47-50 optionally include where the feedback further comprises a phase angle of each beamforming vector of the smooth beamforming vectors or matrixes, and where the method further comprises: decompressing the smooth beamforming vectors or matrixes using the phase angle of each beamforming vector of the smooth beamforming vectors or matrixes.

Example 52 is an apparatus of an access point, the apparatus including: means for decoding feedback from the station in response to a null data packet(NDP), the feedback including quantized beamforming vectors or matrixes across tones of a channel of the NDP; means for smoothing the quantized beamforming vectors or matrixes to generate smooth quantized beamforming vectors or matrixes; and means for configuring the access point to transmit a downlink (DL) physical layer convergence procedure (PLCP) protocol data unit (PPDU)(DL PPDU) to the station using beamforming in accordance with the smooth quantized beamforming vectors or matrixes.

In Example 53, the subject matter of Example 52 optionally includes the apparatus further including: means for encoding the DL PPDU to comprise a field that indicates the DL PPDU is beamformed.

In Example 54, the subject matter of any one or more of Examples 52-53 optionally include the apparatus further including: means for encoding the DL PPDU to further comprise a second field to indicate the DL PPDU is beamformed based on the quantized beamforming vectors or matrixes.

In Example 55, the subject matter of any one or more of Examples 52-54 optionally include the apparatus further including: means for smoothing the quantized beamforming vectors or matrixes to generate the smooth quantized beamforming vectors or matrixes using one of the methods of the following group: global phase correction, interpolation, moving average, and rotation within beamforming subspace.

In Example 56, the subject matter of any one or more of Examples 52-55 optionally include where the feedback further comprises a phase angle of each beamforming vector of the smooth beamforming vectors or matrixes, and where the apparatus further comprises: means for decompressing the smooth beamforming vectors or matrixes using the phase angle of each beamforming vector of the smooth beamforming vectors or matrixes.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station comprising: a memory; and processing circuitry couple to the memory, wherein the processing circuitry is configured to:
    decode a null data packet (NDP), the NDP being received on a channel from an access point;
    determine channel matrix estimates across tones of the channel based on the NDP;
    determine beamforming vectors or matrixes from the channel matrix estimate;
    smooth the beamforming vectors or matrixes to generate smooth beamforming vectors or matrixes;
    configure the station to transmit feedback in response to the NDP, the feedback comprising the smooth beamforming vectors or matrixes;
    decode a downlink (DL) physical layer convergence procedure (PLCP) protocol data unit (PPDU)(DL PPDU) from the access point;
    if the DL PPDU is beamformed based on the smooth beamforming vectors or matrixes, use a first channel smoothing method to smooth tones of the DL PPDU; and
    if the DL PPDU is not beamformed based on the smooth beamforming vectors or matrixes, use a second channel smoothing method to smooth tones of the DL PPDU.

2. The apparatus of claim 1, wherein the first channel smoothing method is linear minimum mean square error (LMMSE).

3. The apparatus of claim 1, wherein the processing circuitry is further configured to:
    determine whether the DL is smoothed based on a probabilistic determination.

4. The apparatus of claim 1, wherein the processing circuitry is further configured to:
    quantize the smooth beamforming vectors or matrixes to generate quantized beamforming vectors or matrixes; and
    configure the station to transmit feedback in response to the NDP, the feedback comprising the quantized smooth beamforming vectors or matrixes.

5. The apparatus of claim 4, wherein the processing circuitry is further configured to:
    smooth the beamforming vectors or matrixes to generate smooth beamforming vectors or matrixes using one of the methods of the following group: global phase correction, interpolation, moving average, rotation within beamforming subspace, and feedback with global phase.

6. The apparatus of claim 5, wherein the processing circuitry is further configured to:
    determine the DL PPDU is beamformed based on the quantized smooth beamforming vectors or matrixes, if the station transmitted feedback to the access point comprising the quantized smooth beamforming vectors or matrixes.

7. The apparatus of claim 6, wherein the processing circuitry is further configured to:
    determine the DL PPDU is beamformed based on the quantized smooth beamforming vectors or matrixes, if the station transmitted feedback to the access point comprising the quantized smooth beamforming vectors or matrixes and the DL PPDU includes a field that indicates the DL PPDU is beamformed.

8. The apparatus of claim 4, wherein the feedback further comprises a phase angle of each beamforming vector of the quantized smooth beamforming vectors or matrixes.

9. The apparatus of claim 4, wherein the processing circuitry is further configured to:
    determine the DL PPDU is beamformed based on the quantized smooth beamforming vectors or matrixes, if a field of the DL PPDU indicates that smooth beamforming vectors or matrixes were used to beamform the DL PPDU.

10. The apparatus of claim 1, wherein the processing circuitry is further configured to:
    smooth the beamforming vectors or matrixes to generate smooth beamforming vectors or matrixes using one of the methods of the following group: global phase correction, interpolation, moving average, rotation within beamforming subspace, and feedback with global phase.

11. The apparatus of claim 1, wherein the processing circuitry is further configured to:
    determine the DL PPDU is not beamformed based on the smooth beamforming vectors or matrixes, if the DL PPDU comprises a field that indicates that the DL PPDU is not beamformed or the DL comprises a field that indicates the smooth beamforming vectors or matrixes were not used to beamform the DL PPDU.

12. The apparatus of claim 1, wherein the processing circuitry is further configured to:
    determine the DL PPDU is beamformed based on the smooth beamforming vectors or matrixes, if one or more fields of the DL PPDU indicate that smooth beamforming vectors or matrixes were used to beamform the DL PPDU.

13. The apparatus of claim 1, wherein the processing circuitry is further configured to:
    smooth the channel matrix estimates across tones to generate smoothed channel matrix estimates across tones; and
    determine beamforming vectors or matrixes from the smoothed channel matrix estimates.

14. The apparatus of claim 1, wherein the station and the access point are each one or more from the following group: an Institute of Electrical and Electronic Engineers (IEEE) 802.1 lax access point, an IEEE 802.11 station, an IEEE access point, a station acting as a group owner (GO), and an IEEE 802.11ax station.

15. The apparatus of claim 1, further comprising transceiver circuitry coupled to the memory; and, one or more antennas coupled to the transceiver circuitry.

16. A non-transitory computer-readable storage medium that stores instructions for execution by one or more processors, the instructions to configure the one or more processors to cause an apparatus of a station to:
- decode a null data packet (NDP), the NDP being received on a channel from an access point;
- obtain channel matrix estimates across tones of the channel;
- determine beamforming vectors or matrixes from the channel matrix estimate; and
- smooth the beamforming vectors or matrixes to generate smooth beamforming vectors or matrixes;
- configure the station to transmit feedback in response to the NDP, the feedback comprising the smooth beamforming vectors or matrixes;
- decode a downlink (DL) physical layer convergence procedure (PLCP) protocol data unit (PPDU)(DL PPDU) from the access point;
- if the DL PPDU is beamformed based on the smooth beamforming vectors or matrixes, use a first channel smoothing method to smooth tones of the DL PPDU; and
- if the DL PPDU is not beamformed based on the smooth beamforming vectors or matrixes, use a second channel smoothing method to smooth tones of the DL PPDU.

17. The non-transitory computer-readable storage medium of claim 16, wherein the instructions to further configure the one or more processors to cause the apparatus of the station to:
- quantize the smooth beamforming vectors or matrixes to generate quantized beamforming vectors or matrixes; and
- configure the station to transmit feedback in response to the NDP, the feedback comprising the quantized smooth beamforming vectors or matrixes.

18. A method performed by an apparatus of a station, the method comprising:
- decoding a null data packet (NDP), the NDP being received on a channel from an access point;
- obtaining channel matrix estimates across tones of the channel;
- determining beamforming vectors or matrixes from the channel matrix estimate; and
- smoothing the beamforming vectors or matrixes to generate smooth beamforming vectors or matrixes;
- configuring the station to transmit feedback in response to the NDP, the feedback comprising the smooth beamforming vectors or matrixes;
- decode a downlink (DL) physical layer convergence procedure (PLCP) protocol data unit (PPDU)(DL PPDU) from the access point;
- if the DL PPDU is beamformed based on the smooth beamforming vectors or matrixes, use a first channel smoothing method to smooth tones of the DL PPDU; and
- if the DL PPDU is not beamformed based on the smooth beamforming vectors or matrixes, use a second channel smoothing method to smooth tones of the DL PPDU.

* * * * *